(12) United States Patent
Griffin

(10) Patent No.: US 10,500,602 B2
(45) Date of Patent: Dec. 10, 2019

(54) CANCELLING DAMPING INDUCED BY DRAG IN SYNTHETIC JETS USING PERFORMANCE ENHANCEMENTS

(71) Applicant: The Boeing Company, Chicago, IL (US)

(72) Inventor: Steven F. Griffin, Kihei, HI (US)

(73) Assignee: The Boeing Company, Chicago, IL (US)

( * ) Notice: Subject to any disclaimer, the term of this patent is extended or adjusted under 35 U.S.C. 154(b) by 584 days.

(21) Appl. No.: 15/222,913

(22) Filed: Jul. 28, 2016

(65) Prior Publication Data

US 2017/0056913 A1 Mar. 2, 2017

Related U.S. Application Data

(63) Continuation-in-part of application No. 14/055,522, filed on Oct. 16, 2013, now Pat. No. 9,428,263.

(51) Int. Cl.
*B05B 17/06* (2006.01)
*F04B 37/00* (2006.01)
(Continued)

(52) U.S. Cl.
CPC .......... *B05B 17/0653* (2013.01); *B64C 21/04* (2013.01); *B64C 21/08* (2013.01);
(Continued)

(58) Field of Classification Search
CPC ..... B05B 17/0653; B64C 21/04; B64C 21/08; B64C 2230/06; B64C 23/06;
(Continued)

(56) References Cited

U.S. PATENT DOCUMENTS 4,180,375 A * 12/1979 Magnussen, Jr. ...... B01D 15/14
417/22
4,229,939 A 10/1980 Smith
(Continued)

FOREIGN PATENT DOCUMENTS

| CA | 2029167 A1 | 6/1991 | |
|---|---|---|---|
| CN | 102953883 A * | 3/2013 | ............. F02M 51/04 |
| GB | 2091910 A | 8/1982 | |

OTHER PUBLICATIONS

"Electrical Signals" https://web.archive.org/web/20130309011415/ https://electronicsclub.info/acdc.htm (Year: 2013).*
(Continued)

*Primary Examiner* — Essama Omgba
*Assistant Examiner* — Christopher J Brunjes
(74) *Attorney, Agent, or Firm* — Yee & Associates, P.C.

(57) ABSTRACT

An active flow control drag-induced damping reduction apparatus. The apparatus includes a variable frequency signal power supply; a jet generator defining an internal cavity and having pump member, and coupled to the variable frequency signal power supply to receive a control signal; a feedback sensor coupled to the pump member to generate a feedback signal measuring the reciprocating motion of the pump member; a detection circuit that receives the feedback signal and measures a difference compared to the variable frequency generator; and an adjustment circuit that receives the measured difference and tunes the variable frequency signal of the variable frequency signal power supply to maintain the jet generator at an optimum flow.

10 Claims, 13 Drawing Sheets

(51) Int. Cl.
*F04B 35/04* (2006.01)
*F04B 49/06* (2006.01)
*F04B 51/00* (2006.01)
*B64C 21/08* (2006.01)
*B64C 21/04* (2006.01)
*F04F 7/00* (2006.01)
*F15D 1/00* (2006.01)

(52) U.S. Cl.
CPC .............. *F04B 35/04* (2013.01); *F04B 37/00* (2013.01); *F04B 49/06* (2013.01); *F04B 51/00* (2013.01); *F04F 7/00* (2013.01); *F15D 1/0095* (2013.01); *B64C 2230/04* (2013.01); *B64C 2230/06* (2013.01); *B64C 2230/18* (2013.01); *Y02T 50/166* (2013.01)

(58) Field of Classification Search
CPC .............. B64C 23/005; B64C 2230/18; B64C 2230/04; B64C 2700/6274; F04F 7/00; F15D 1/0095; F04B 49/06; F04B 35/04; F04B 37/00; F04B 39/12; F04B 39/005; F04B 51/00; F04B 43/095; F04B 45/047; Y02T 50/166
See application file for complete search history.

(56) References Cited

U.S. PATENT DOCUMENTS

| | | | |
|---|---|---|---|
| 4,722,360 A | 2/1988 | Odajima et al. | |
| 4,743,190 A * | 5/1988 | Brunnschweiler | B22D 17/2015 164/155.4 |
| 4,988,015 A | 1/1991 | Price | |
| 5,938,404 A | 8/1999 | Domzalski et al. | |
| 6,135,719 A * | 10/2000 | Yoder | F04B 9/105 137/551 |
| 6,320,113 B1 | 11/2001 | Griffin et al. | |
| 6,412,732 B1 | 7/2002 | Amitay et al. | |
| 6,457,654 B1 | 10/2002 | Glezer et al. | |
| 6,821,090 B1 | 11/2004 | Hassan et al. | |
| 2006/0181557 A1 | 8/2006 | Hoisington et al. | |
| 2007/0095987 A1 | 5/2007 | Glezer et al. | |
| 2007/0205853 A1 | 9/2007 | Taya et al. | |
| 2010/0043896 A1* | 2/2010 | Shock | F17D 5/02 137/613 |
| 2010/0229952 A1 | 9/2010 | Smith et al. | |
| 2011/0275987 A1* | 11/2011 | Caffey | A61M 5/14526 604/67 |
| 2011/0313238 A1* | 12/2011 | Reichenbach | A61M 1/1086 600/16 |
| 2012/0153041 A1 | 6/2012 | Ternoy | |
| 2014/0011146 A1 | 1/2014 | Monson | |
| 2015/0104310 A1 | 4/2015 | Griffin | |
| 2016/0186732 A1* | 6/2016 | Xi | F02M 51/04 417/415 |

OTHER PUBLICATIONS

European Search Report, European Application No. 14188660, dated Mar. 23, 2015.
Smith, et al., A Comparison between synthetic jets and continuous jets, Experiments in Fluids 34, 2003, pp. 467-472.
You, et al., Study of flow separation over an airfoil with synthetic jet control using large-eddy simulation. Center for Turbulence Research, Annual Research Briefs 2007, pp. 311-321.
Simmers, Jr., et al., Improved Piezoelectric Self-Sensing Actuation, Journal of Intelligent Material Systems and Structures, 15 (12), 941-953, 2004.
Dosch, et al., A Self-Sensing Piezoelectric Actuator for Collocated Control, Journal of Intelligent Material Systems and Structures, vol. 3, Jan. 1992, pp. 167-185.
Griffin, et al., Active Vibroacoustic Device for Noise Reduction in Launch Vehicles, Journal of Spacecraft and Rockets, vol. 45, No. 6, Nov.-Dec. 2008, pp. 1282-1292.
Leo, et al., Microcontroller-Based Implementation of Adaptive Structural Control, SPIE Conference on Smart Structures and Integrated Systems, San Diego, California, Mar. 1998, SPIE vol. 3329, pp. 115-127.
Denoyer, et al., Hybrid structural/acoustic control of a sub-scale payload fairing, SPIE Conference on Smart Structures and Integrated Systems, San Diego, California, Mar. 1998, SPIE vol. 3329, pp. 237-243.
Griffin, "Acoustic Replication in Smart Structures Using Active Structural Acoustic Control," Thesis, Nov. 1995, Georgia Institute of Technology, 183 pages.
Office Action dated Dec. 21, 2015 regarding U.S. Appl. No. 14/055,522, 22 pages.
Notice of Allowance dated Apr. 28, 2016 regarding U.S. Appl. No. 14/055,522, 9 pages.

* cited by examiner

CANCELLING DAMPING INDUCED BY DRAG IN SYNTHETIC JETS USING PERFORMANCE ENHANCEMENTS

PRIORITY DATA

This application is a continuation-in-part application of U.S. application Ser. No. 14/055,522, filed Oct. 16, 2013.

BACKGROUND INFORMATION

1. Field

The exemplary embodiments generally relate to synthetic jets and, more particularly, to driving and monitoring synthetic jet generators. The advantageous embodiments also relate generally to decreasing the effects of drag of a jet as it leaves an aperture.

2. Background

Actuators of a synthetic jet generator are generally driven with a sinusoidal input at a frequency that generates an optimum jet velocity based on the frequency response of the synthetic jet generator. Determining the frequency that results in optimum flow generally requires a calibration routine using an external sensor, for example, an accelerometer. External sensors that have a proper size, noise floor, dynamic range, and robustness for synthetic jet generator applications are generally expensive, typically costing more than the synthetic jet generator itself. The external sensors are generally intrusive and are not conducive to in-situ measurements of the synthetic jet generator.

In the event that the frequency response of the synthetic jet generator shifts, due to structural changes in the generator or environmental conditions, re-characterization of the synthetic jet generator generally requires at least re-attaching an external sensor and re-executing the calibration routine. In certain applications, for example, when the generator is attached to a wing in flight, re-characterization may be prohibited. Furthermore, determining if the synthetic jet generator has degraded and is approaching a failure condition is not feasible without dismantling the generator from its application and returning the generator to a test bed where the external sensor may be attached, and the calibration routine re-executed.

It would be advantageous to be able to characterize a synthetic jet generator without using a calibration routine and a costly external sensor. It would also be advantageous to tune a driving frequency of the synthetic jet generator to maintain the optimum jet velocity, or optimum flow and to determine if the synthetic jet generator is approaching a failure condition.

In addition, a limit on the velocity of the jet is damping induced by drag of the fluid as it emerges from an aperture in the synthetic jet generator. This drag is the primary cause of damping at the resonant frequency at which the jet operates. It would be advantageous to decrease the damping caused by drag and thereby increase the velocity of the jet emerging from the aperture.

SUMMARY

An illustrative embodiment of the present disclosure provides for an active flow control drag-induced damping reduction apparatus. The apparatus includes a variable frequency signal power supply. The apparatus also includes a jet generator defining an internal cavity and having pump member, and coupled to the power supply to receive a control signal. The apparatus also includes a feedback sensor coupled to the pump member to generate a feedback signal measuring the reciprocating motion of the pump member. The apparatus also includes a detection circuit that receives the feedback signal and measures a difference compared to the variable frequency generator. The apparatus also includes an adjustment circuit that receives the measured difference and tunes the variable frequency signal of the power supply to maintain the jet generator at an optimum flow.

The advantageous embodiments also provide for a synthetic jet generator. The synthetic jet generator includes a chamber defined by a housing, wherein an aperture is disposed in the housing, and wherein a fluid is disposed in the chamber. The synthetic jet generator also includes a piston operably disposed to repeatedly compress the fluid in the chamber, wherein during compression strokes the piston forces a jet of the fluid to flow from the aperture. The synthetic jet generator also includes a motor connected to the piston and configured to drive the piston. The synthetic jet generator also includes a drive circuit in communication with the motor and configured to control operation of the piston by generating a drive signal communicated to the motor. The synthetic jet generator also includes a sensor operably connected to one of the piston and the housing, and configured to take a measurement of a motion of the piston. The synthetic jet generator also includes a feedback circuit connected to the sensor and to the drive circuit, and configured to incorporate a feedback signal into the drive signal, wherein the feedback signal includes the measurement of the motion of the piston at a resonance frequency of the chamber.

The advantageous embodiments also provide for a method of improving operation of a synthetic jet generator. The method includes cancelling the damping effects of drag-induced damping of a jet of a fluid exiting an aperture of a housing that defines a chamber in which a piston repeatedly compresses the fluid in the chamber at a resonance frequency of the chamber.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 4 shows an exemplary transfer function, in accordance with an illustrative embodiment;

DETAILED DESCRIPTION

Figure 1:
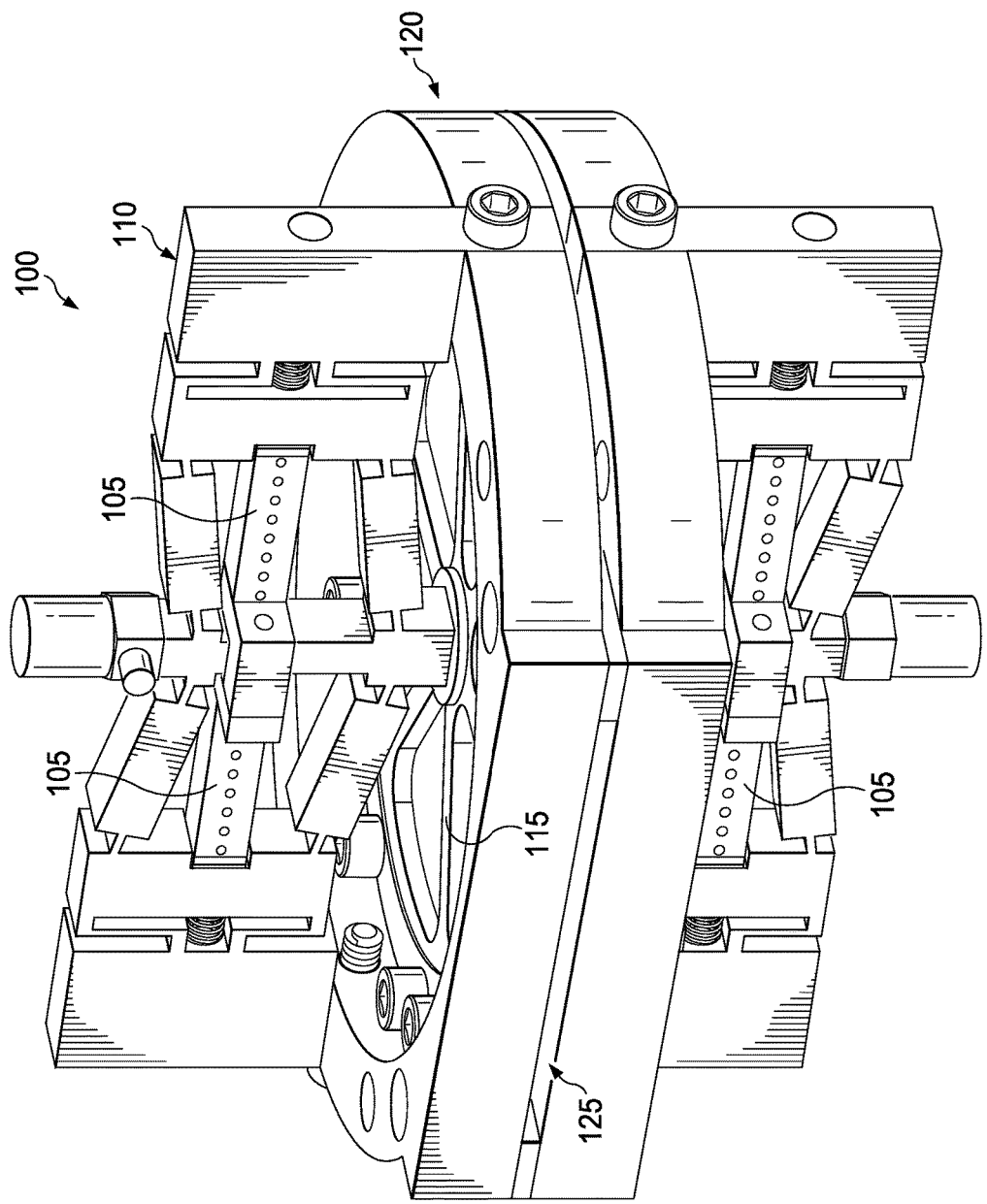
FIG. 1 shows a schematic illustration of a synthetic jet generator in accordance with in accordance with an illustrative embodiment.

FIG. 1 shows a schematic illustration of a synthetic jet generator in accordance with in accordance with an illustrative embodiment. The exemplary jet generator operates by moving a fluid back and forth through an opening or aperture. A synthetic jet may be produced by the cyclic suction and expulsion of the fluid from a cavity through the opening by a piston or diaphragm. The exemplary jet generator 100 includes one or more actuators 105, one or more flexures 110, one or more pistons 115, at least one cavity 120 and at least one aperture 125.

In one aspect, the actuator 105 may comprise a piezoelectric or electro-strictive element driven by applying a voltage across the element. In another aspect, the actuator may be made of a stack of piezoelectric or electro-strictive elements driven by applying a voltage across each element of the stack. The piezoelectric or electro-strictive elements may comprise, for example, barium titanite, gallium orthophosphate, lead magnesium niobate, lead lanthanum zirconate titanate, lead titanite, lead zirconate titanite, lithium niobate, lithium tantalite, potassium niobate, or any other suitable material. In yet another aspect, the actuator may be a speaker coil. It should be understood that the exemplary jet generator 100 may include a single actuator or may include multiple actuators. One or more flexures 110 may be coupled to the actuator 105 to amplify the motion of the actuator. The flexure 110 may generally be a mechanical flexure but other motion amplification mechanisms, for example, a servo-mechanism, may also be used. The actuator 105, either alone or in combination with the flexure 110, may drive a piston 115 to displace a fluid, for example air. The piston may be operated as a rigid body or may be periodically bowed, bent, or otherwise deformed to change the volume of the cavity and force the fluid in and out of the cavity 120 through aperture 125. The actuator may be driven with a sinusoidal signal that is determined, based on the behavior of the jet generator 100, to provide optimum jet momentum or velocity, generally referred to as optimum flow. In at least one aspect, the exemplary jet generator 100 may include two opposed flexures respectively coupled to two opposed pistons that operate synchronously to displace fluid in cavity 120 inward and outward through aperture 125.

As mentioned above, an external sensor such as an accelerometer may be used in a calibration routine to identify characteristics of the jet generator 100, for example, a driving frequency that produces an optimum flow. In contrast, according to the disclosed embodiment, the actuator 105 of the jet generator may be used as an in-situ sensor to detect the optimum flow frequency. The actuator 105 may also be used to indicate changes in the optimum flow frequency due, for example, to changes in fluid density, temperature, or other conditions. In addition, the actuator 105 may be used to provide a health assessment to identify approaching failure conditions.

Figure 2:
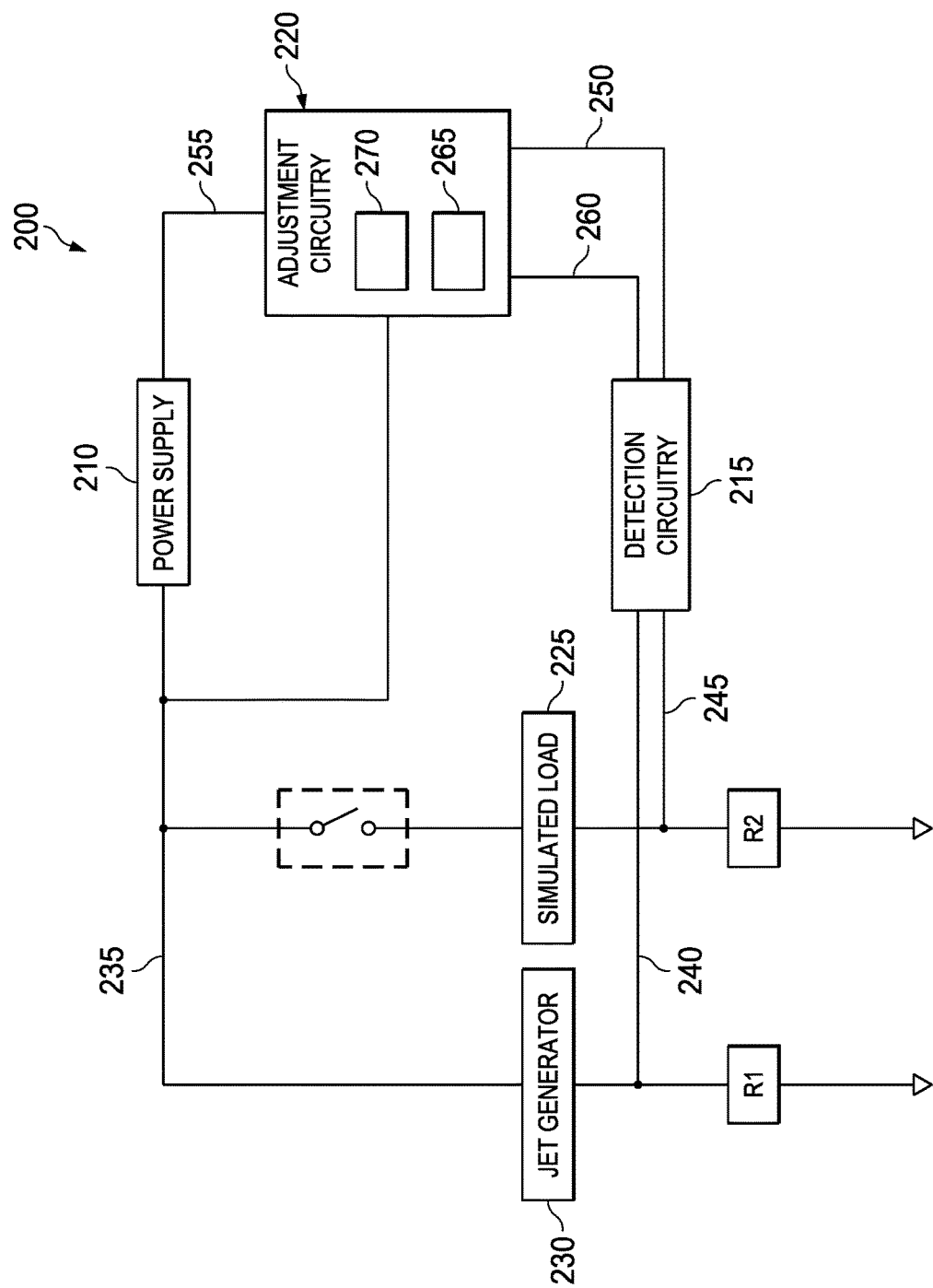
FIG. 2 shows a block diagram of circuitry for characterizing and monitoring performance of a synthetic jet generator in accordance with in accordance with an illustrative embodiment.

FIG. 2 shows a block diagram of circuitry for characterizing and monitoring performance of a synthetic jet generator in accordance with in accordance with an illustrative embodiment. Thus, a block diagram of an apparatus 200 that may be used to characterize and monitor a synthetic jet generator 230 according to the disclosed embodiment is shown in FIG. 2. The apparatus may include a power supply 210, detection circuitry 215, and adjustment circuitry 220. To accomplish self-sensing, an electrical load 225 simulating an electrical load of the jet generator 230 may also be included. Resistors with matching resistances R1, R2 may be provided in series with the jet generator 230 and the simulated load 225, respectively.

It should be understood that power supply 210, detection circuitry 215, and adjustment circuitry 220 may generally include any circuitry or programs for performing the functions described according to the aspects of the disclosed embodiment, including one or more processors, field programmable gate arrays, programmable logic devices, gate array logic devices, state machines, and memory devices. The memory devices may include computer readable or usable media, and computer readable or usable storage media encoded with computer executable components, software, programs, instructions, or commands for implementing the disclosed embodiment. Power supply 210, detection circuitry 215, and adjustment circuitry 220 may also include any suitable sensors, digital signal processors, phase locked loop circuits, buffers, analog to digital and digital to analog converters, level shifters, amplifiers, rectifiers, or any other suitable electrical components for performing the functions described herein.

It should also be understood that, while the power supply 210, detection circuitry 215, and adjustment circuitry 220 are described separately, they may be incorporated into a single element or their functions and circuitry may be distributed across any number of hardware or software elements.

The power supply 210 may provide an input signal 235 to the jet generator 230 and to the simulated electrical load 225. The power supply may use a bridge circuit to drive the jet generator 230 and the simulated load 225, or any suitable drive circuit that provides the voltage, currents, and slew rates required to drive the jet generator 230 and the simulated load 225. In one aspect, the input signal 235 may have a single frequency and the power supply may vary the frequency to produce an optimum flow according to control parameters provided by adjustment circuitry 220. In at least one aspect, the jet generator 230 produces the optimum flow when the input signal 235 causes the jet generator 230 to operate at a resonant frequency of the jet generator.

It should be noted that the simulated load 225 may be selectively disconnected from signal 235 in order to reduce an amount of power required by the power supply 210 and may be connected when required for characterization and monitoring of the jet generator 230.

In one aspect, the detection circuitry 215 may be connected to the jet generator 230 and may be arranged to determine a frequency of a signal 240 through the jet generator 230 and provide an output signal 260 indicative of the frequency. The adjustment circuitry 220 may sense output signal 260 and provide control parameters 255 to the power supply 210 for tuning the variable frequency of the power supply so that the input signal 235 causes the jet generator to maintain the optimum flow. In one exemplary aspect, adjustment circuitry 220 may include a microcontroller implemented adaptive feedback algorithm 270 that uses a phase locked loop circuit to compare input signal 235 and output signal 260 to track a resonant frequency of jet generator 230 and provide control parameters 255 to the power supply 210 for tuning the variable frequency of the power supply so that the input signal 235 causes the jet generator to operate at a resonant frequency to maintain the optimum flow. In other aspects, any circuitry suitable for monitoring variations in a resonant frequency of the jet generator and providing control parameters to the power supply to maintain the jet generator operation at the optimum flow may be utilized.

Figure 3A:
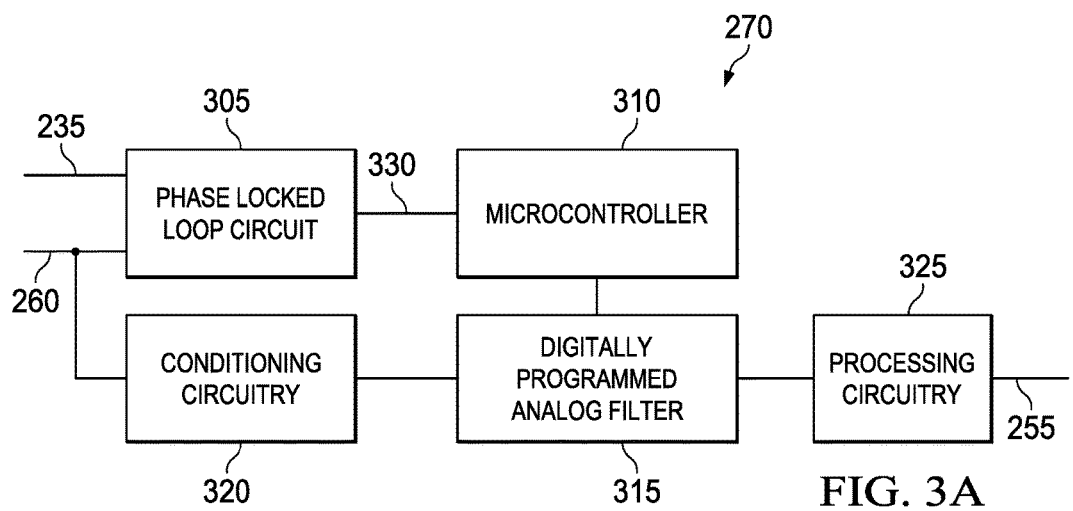
FIG. 3A shows a block diagram of an exemplary microcontroller executed adaptive feedback algorithm in accordance with in accordance with an illustrative embodiment.

FIG. 3A shows a block diagram of an exemplary microcontroller executed adaptive feedback algorithm in accordance with an illustrative embodiment. FIG. 3A shows a block diagram of an exemplary implementation of the microcontroller executed adaptive feedback algorithm 270, including a phase locked loop circuit 305, a microcontroller 310, a digitally programmed analog filter 315, conditioning circuitry 320 and processing circuitry 325. In one aspect, the phase locked loop circuit 305 and digitally programmed analog filter 315 may be used to effect a tuned second order control system for tracking an operating frequency of the synthetic jet generator. The phase locked loop circuit 305 may be used to compare signals 235 and 260 and provide a signal 330 proportional to the difference between signals 235 and 260 to microcontroller 310. Microcontroller 310 may analyze the proportional signal 330 to set filter parameters for the digitally programmed analog filter 315. In one aspect, digitally programmed analog filter 315 may be a switched capacitor filter with a switching frequency set by signal 260 as conditioned by conditioning circuitry 320. The output of the digitally programmed analog filter 315 may then be filtered or further processed by processing circuitry 325 to provide the control parameters 255 for power supply 235.

In another aspect, the detection circuitry 215 may be connected to the jet generator 230 and the simulated load may be arranged to measure a difference between the signal 240 through the jet generator 230 and signal 245 through the simulated load 225. The detection circuitry 215 may provide an output signal 250 to the adjustment circuitry 220 that is proportional to the difference between the signals 240, 245. In one aspect, the output signal 250 is indicative of a difference in current through the jet generator 230 and the simulated load 225. In another aspect, an electrical load of the jet generator 230 and the simulated electrical load are both substantially capacitive. In yet another aspect, for example, when the jet generator uses a speaker coil as an actuator, the electrical load of the jet generator 230 and the simulated electrical load may both be substantially inductive. In both aspects, the output signal 250 may indicate an amount of current used to actuate the jet generator 230.

The adjustment circuitry 220 may include calculation circuitry 265 for determining a transfer function from the input signal and the difference in signals between the jet generator and the simulated load represented by output signal 250 over an operating frequency range of the synthetic jet generator.

Figure 3B:
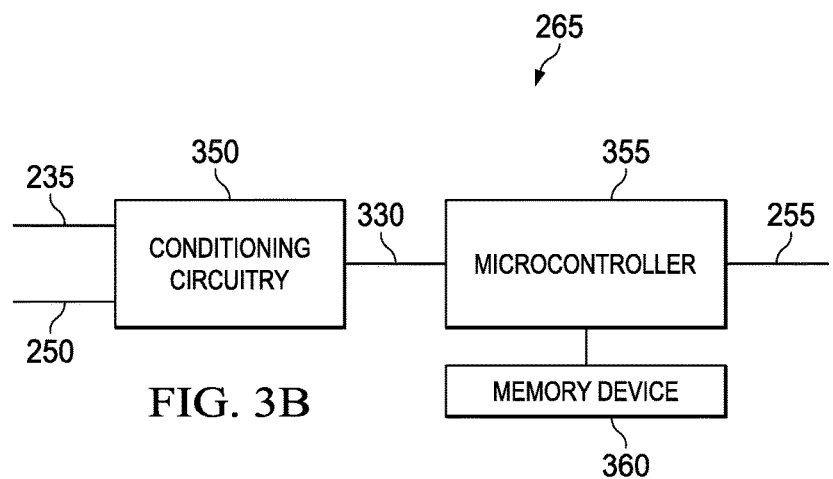
FIG. 3B shows a block diagram of exemplary calculation circuitry in accordance with in accordance with an illustrative embodiment.

FIG. 3B shows a block diagram of exemplary calculation circuitry in accordance with an illustrative embodiment. Thus, FIG. 3B shows a block diagram of an example of calculation circuitry 265 for determining and utilizing a transfer function. In at least one aspect, calculation circuitry 265 includes signal conditioning circuitry 350, a microcontroller 355, and a memory device 360. Calculation circuitry 265, under control of the microcontroller 355 may provide control parameters 255 that cause the power supply 210 to vary a frequency of the input signal over an operating frequency range of the jet generator 230. As the frequency varies, the microcontroller may store data representing the difference in signals between the jet generator and the simulated load, provided by output signal 250 and conditioned by conditioning circuitry 350, in memory 360. The microcontroller 355 may use the data to calculate a transfer function of the differenced signal 250 over the input signal 235 for selected intervals over the operating frequency range of the jet generator 230.

Figure 4:
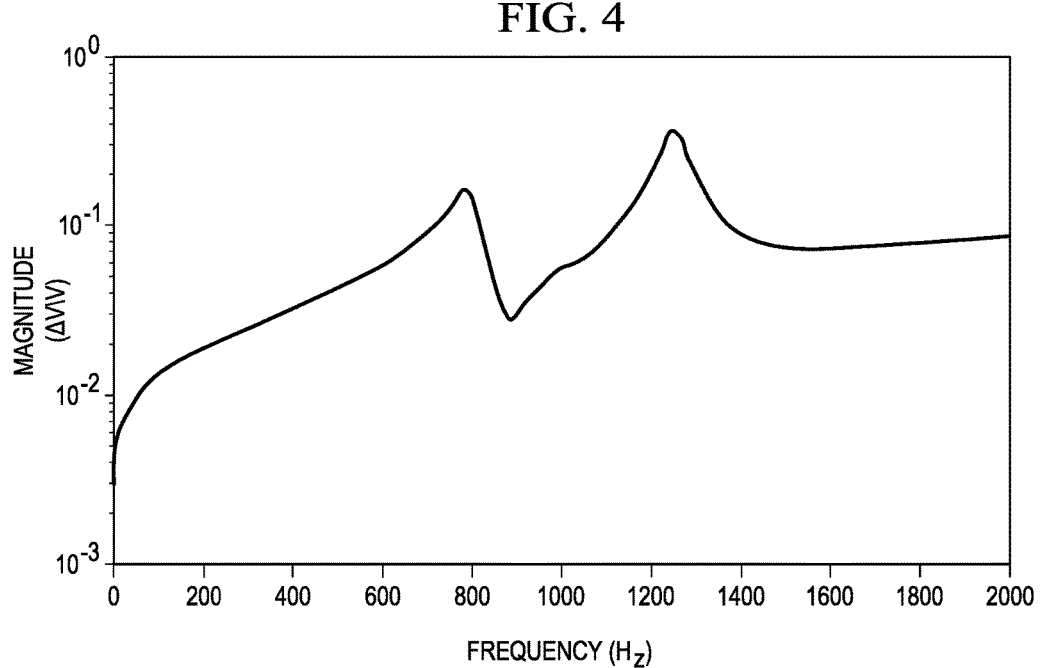
FIG. 4 shows an exemplary transfer function of a synthetic jet generator in accordance with in accordance with an illustrative embodiment.

FIG. 4 shows an exemplary transfer function, in accordance with an illustrative embodiment. The transfer function 400 may be analyzed by the microcontroller 355 to identify one or more resonant frequencies of the jet generator 230 at which the jet generator 230 produces an optimum flow, and the microcontroller 355 may generate control parameters for the power supply 210 to operate the jet generator 230 at an optimum flow at one of the resonant frequencies. In at least one aspect, the adjustment circuitry may implement a feedback system to operate the synthetic jet generator 230 at the optimum flow.

It should be understood that the transfer function may also be determined independently of the systems described herein, for example, by independent measurement on a separate test bed, by independent calculations on other systems, by modeling on other systems, or by any process suitable for determining a transfer function describing the operation of the synthetic jet generator.

The microcontroller 355 may also include circuitry for identifying changes in the transfer function corresponding to changes in the one or more resonant frequencies of the jet generator 230 caused by, for example, changes in environmental conditions such as fluid density and temperature. In response, the microcontroller 355 may generate control parameters 255 for the power supply 210 to change a frequency of signal 235 as a resonant frequency of the jet generator 230 changes so that jet generator 230 continues to produce an optimum flow. The adjustment circuitry 220 may also include circuitry for determining an indication of the health of the jet generator 230 from changes in the transfer function.

Figure 5:
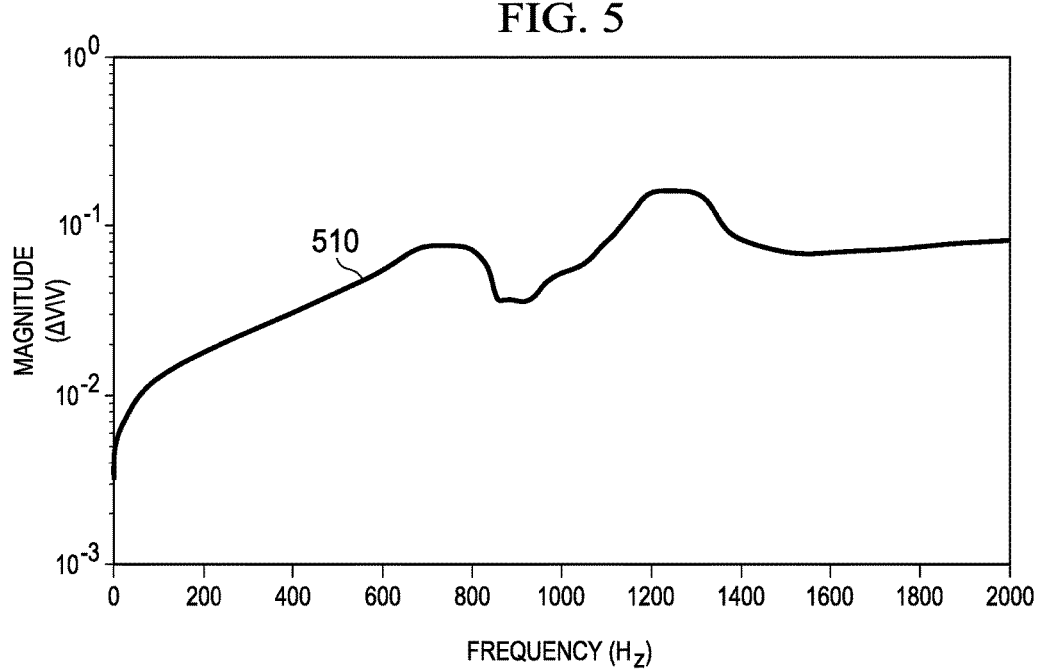
FIG. 5 shows another exemplary transfer function of a synthetic jet generator in accordance with in accordance with an illustrative embodiment.

FIG. 5 shows another exemplary transfer function of a synthetic jet generator in accordance with in accordance with an illustrative embodiment. As an example, FIG. 5 shows a transfer function 500 originally illustrated in FIG. 4 but with clipped peaks 510. Particular variations in the transfer function may identify approaching failure conditions, for example, a damaged flexure or actuator with a limited range of motion. In this example, the flexure or actuator may continue to operate but with reduced effectiveness. The adjustment circuitry may provide control parameters to the power supply to maintain the original transfer function, or provide control parameters to the power supply to operate the jet generator at a reduced capacity until the jet generator may be serviced.

In at least one aspect, the stored data may be used to calculate a back electromotive force (emf) signature of the jet generator actuator, for example, where the jet generator uses a speaker coil as an actuator. The detection circuitry in combination with the adjustment circuitry may be configured to determine the health indicator as a function of changes in the back emf signature. Deviations in the back emf may provide an indication of approaching failure conditions, and in response, the adjustment circuitry may provide control parameters to the power supply to maintain the jet generator at the optimum flow, or may provide control parameters to the power supply to operate the jet generator at a reduced capacity.

It should be understood that the back emf signature may also be determined independently of the systems described herein, for example, by independent measurement on a separate test bed, by independent calculations on other systems, by modeling on other systems, or by any process suitable for determining the back emf of the synthetic jet generator over the operating frequency range.

The adjustment circuitry may optionally send an alert of a pending failure to a user or to an external system, or may provide control parameters to the power supply causing the power supply to send the alert.

Figure 6:
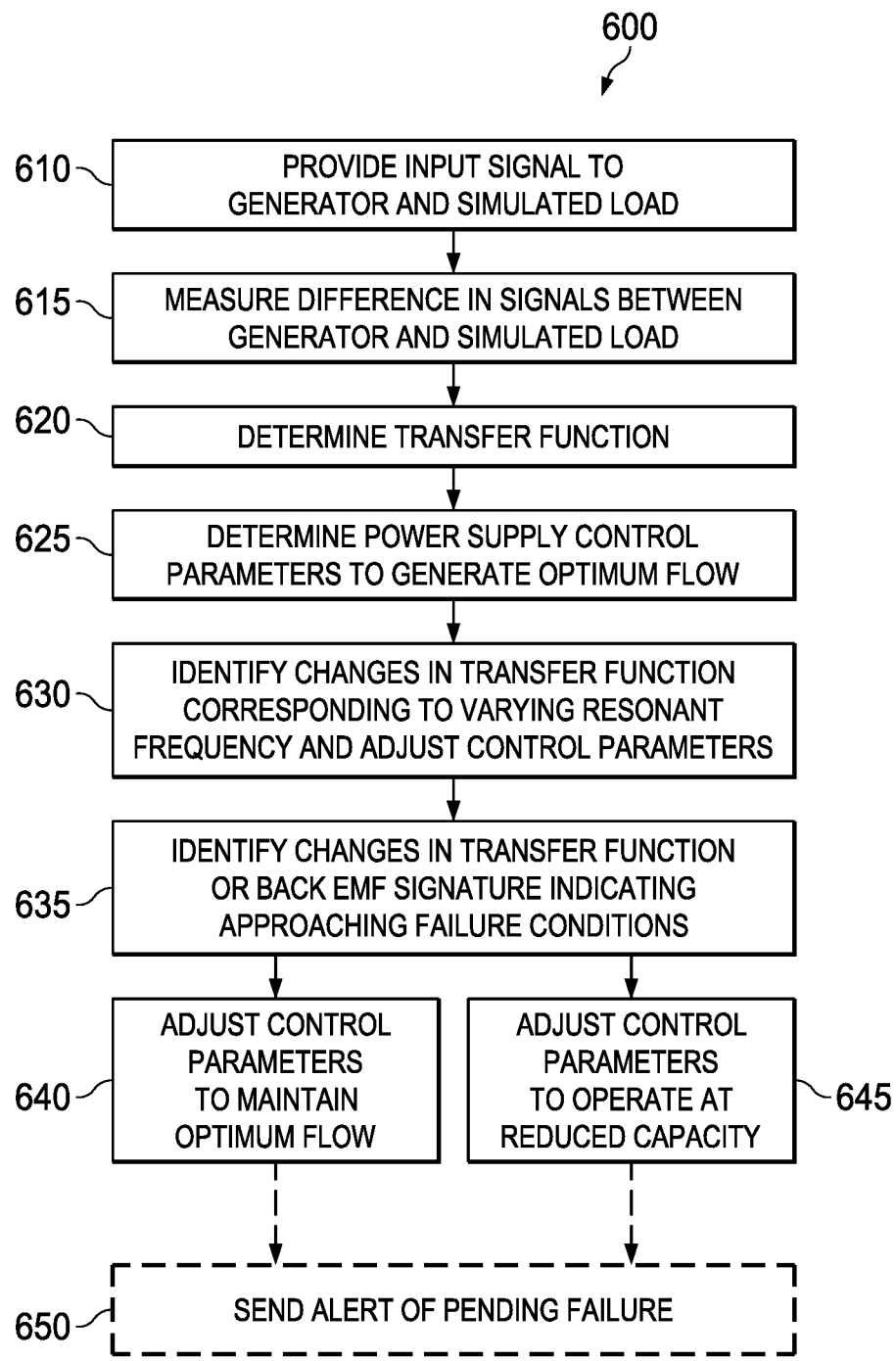
FIG. 6 shows a procedure for characterizing and monitoring performance of a synthetic jet generator in accordance with in accordance with an illustrative embodiment.

FIG. 6 shows a procedure for characterizing and monitoring performance of a synthetic jet generator in accordance with in accordance with an illustrative embodiment. Thus, FIG. 6 shows a procedure 600 for characterizing and monitoring performance of a synthetic jet generator in accordance with aspects of the disclosed embodiment. In block 610 an input signal is provided to the jet generator 230 and the simulated load 225 over an operating frequency range of the jet generator 230. In block 615, a difference in signals between the jet generator and the simulated electrical load is measured over the operating frequency range of the jet generator 230. In block 620, a transfer function is determined from the input signal and the difference in signals between the jet generator and the simulated electrical load. In block 625, the transfer function is used to determine control parameters for the input signal to cause the synthetic jet to generate an optimum flow. In block 630, changes in the transfer function corresponding to a varying resonant frequency of the jet generator 230 are identified and the control parameters are adjusted to vary a frequency of the input signal so that the jet generator 230 operates at the varying resonant frequency to produce the optimum flow. In block 635, changes in the transfer function or back emf signature that may identify approaching failure conditions are recognized and in block 640, the control parameters are adjusted to maintain the jet generator 230 at the optimum flow. Alternately, in block 645, the control parameters are adjusted to operate the jet generator at a reduced capacity until the jet generator may be serviced. Optionally, in block 650, an alert of a pending failure may be sent to a user or to an external system.

Figure 7:
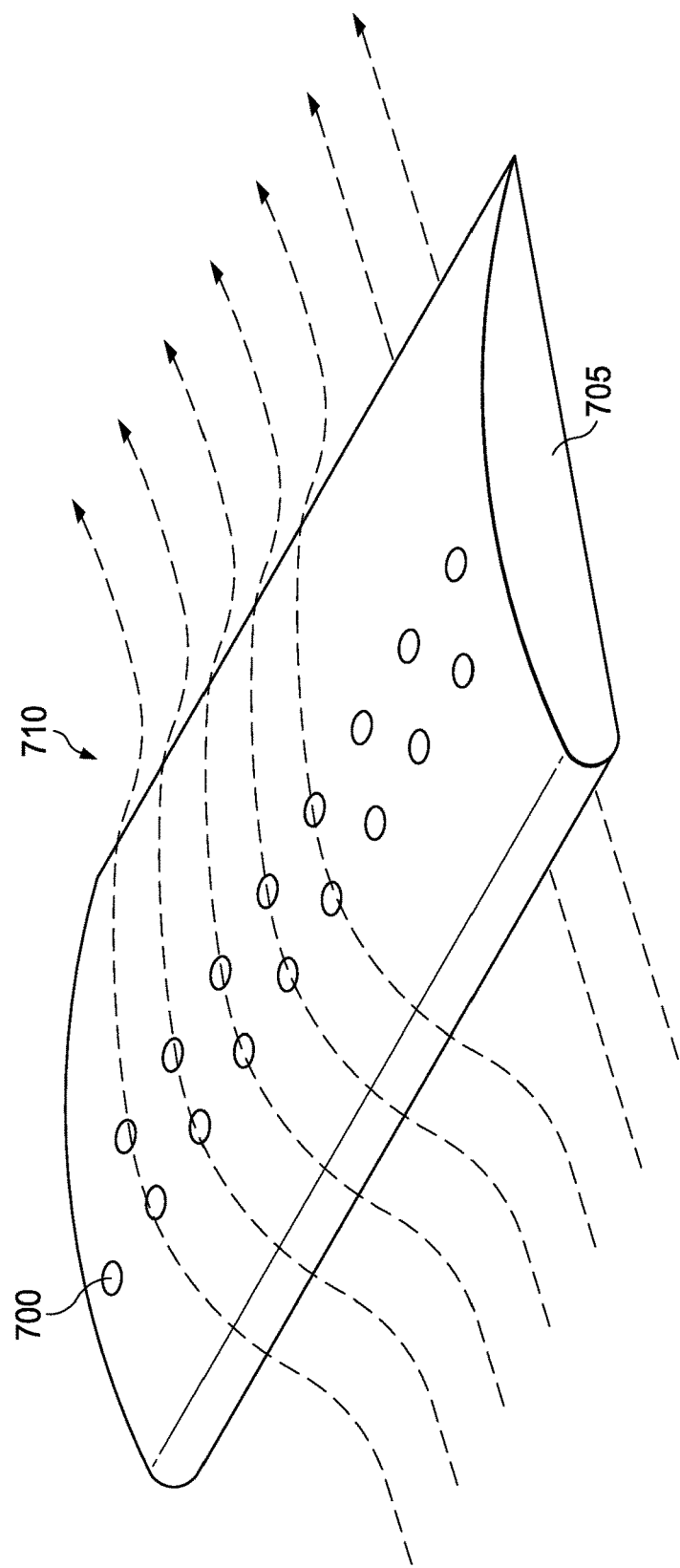
FIG. 7 shows a schematic diagram of one or more synthetic jets used in combination with an airfoil in accordance with in accordance with an illustrative embodiment.

FIG. 7 shows a schematic diagram of one or more synthetic jets used in combination with an airfoil in accordance with in accordance with an illustrative embodiment. Thus, FIG. 7 shows a schematic diagram of an exemplary aspect of the disclosed embodiment where one or more synthetic jets 700 may be used in combination with an airfoil 705 to achieve active flow control. For example, the one or more synthetic jets 700 may be used to control flow separation by adding or subtracting energy from a fluid boundary layer 710. In particular, the one or more synthetic jets 700 may be used to decrease drag by suppressing flow separation or shedding in order to prevent leading edge stall at high angles of attack. It should be understood that the one or more synthetic jets shown in FIG. 7 may be characterized, monitored, and controlled by circuitry as exemplified in apparatus 200 described above. It should also be understood that the locations, arrangement and number of synthetic jets in FIG. 7 are shown as examples only and that any suitable configuration and quantity may be utilized. An exemplary airfoil with synthetic jets is shown in U.S. Pat. No. 5,938,404, incorporated by reference in its entirety.

In accordance with one or more aspects of the disclosed embodiment, an apparatus includes a power supply for providing an input signal at a variable frequency to a jet generator effecting a jet and to a simulated electrical load of the jet generator, detection circuitry for measuring a difference in signals between the jet generator and the simulated electrical load to effect an optimum flow of the jet, and adjustment circuitry for tuning the variable frequency of the power supply to maintain the jet at the optimum flow.

In accordance with one or more aspects of the disclosed embodiment, the adjustment circuitry is configured to determine a transfer function from the input signal and the difference in signals between the jet generator and the simulated electrical load over a frequency range, for determining control parameters for tuning the variable frequency of the power supply.

In accordance with one or more aspects of the disclosed embodiment, the adjustment circuitry is configured to distinguish alterations in the transfer function indicating degradation of the jet generator. In accordance with one or more aspects of the disclosed embodiment, the jet generator produces the optimum flow at a resonant frequency of the jet generator. In accordance with one or more aspects of the disclosed embodiment, the jet generator comprises a synthetic jet.

In accordance with one or more aspects of the disclosed embodiment, the jet generator comprises a piezo-electric device. In accordance with one or more aspects of the disclosed embodiment, the jet generator comprises an electro-strictive device. In accordance with one or more aspects of the disclosed embodiment, the jet generator comprises a speaker coil.

In accordance with one or more aspects of the disclosed embodiment, a control system includes a power supply for providing power at a variable frequency to a jet generator effecting a jet and to a simulated electrical load of the jet generator, detection circuitry for measuring a difference in current through the jet generator and simulated electrical load to effect an optimum flow of the jet, and adjustment circuitry for tuning the variable frequency of the power supply to maintain the jet at the optimum flow. In accordance with one or more aspects of the disclosed embodiment, the control system includes calculation circuitry for determining a transfer function from the power and the difference in current between the jet generator and simulated electrical load over a frequency range, for determining control parameters for the adjustment circuitry.

In accordance with one or more aspects of the disclosed embodiment, the calculation circuitry is configured to distinguish alterations in the transfer function indicating degradation of the jet generator. In accordance with one or more aspects of the disclosed embodiment, the jet generator produces the optimum flow at a resonant frequency of the jet generator. In accordance with one or more aspects of the disclosed embodiment, the jet generator comprises a synthetic jet.

In accordance with one or more aspects of the disclosed embodiment, a method of controlling a jet generator includes providing an input signal at a variable frequency to the jet generator and to a simulated electrical load of the jet generator, measuring a difference in signals between the jet generator and the simulated electrical load to effect an optimum flow of a jet generated by the jet generator, and tuning the frequency of the input signal to maintain the jet at the optimum flow. In accordance with one or more aspects of the disclosed embodiment, the method includes determining a transfer function from the input signal and the difference in signals between the jet generator and the simulated electrical load to determine control parameters for tuning the variable frequency of the input signal.

In accordance with one or more aspects of the disclosed embodiment, the method includes distinguishing alterations in the transfer function indicating degradation of the jet generator. In accordance with one or more aspects of the disclosed embodiment, the jet generator produces the optimum flow at a resonant frequency of the jet generator.

In accordance with one or more aspects of the disclosed embodiment, the jet generator comprises a synthetic jet. In accordance with one or more aspects of the disclosed embodiment, the jet generator comprises a piezo-electric device.

In accordance with one or more aspects of the disclosed embodiment, the jet generator comprises an electro-strictive device. In accordance with one or more aspects of the disclosed embodiment, the jet generator comprises a speaker coil.

In accordance with one or more aspects of the disclosed embodiment, a method of characterizing and monitoring performance of a synthetic jet generator includes providing an input signal to the synthetic jet generator and to a simulated electrical load of the synthetic generator over an operating frequency range of the synthetic jet generator, measuring a difference in signals between the jet generator and the simulated electrical load over the operating frequency range, determining a transfer function from the input signal and the difference in signals between the jet generator and the simulated electrical load, and using the transfer function to determine control parameters for the input signal to cause the synthetic jet generator to generate an optimum flow. In accordance with one or more aspects of the disclosed embodiment, the method includes identifying changes in the transfer function corresponding to a varying resonant frequency of the synthetic jet generator. In accordance with one or more aspects of the disclosed embodiment, the method includes adjusting the control parameters to change a frequency of the input signal to cause the synthetic jet generator to operate at the varying resonant frequency to generate the optimum flow.

In accordance with one or more aspects of the disclosed embodiment, the method includes detecting a variation from the transfer function signifying an approaching failure condition and adjusting the control parameters to maintain the synthetic jet generator at the optimum flow or adjusting the control parameters to operate the synthetic jet generator at a reduced capacity. In accordance with one or more aspects of the disclosed embodiment, the method includes sending an alert of the approaching failure condition. In accordance with one or more aspects of the disclosed embodiment, the method includes measuring a difference in signals between the jet generator and the simulated electrical load over the operating frequency range to determine a back emf signature of the jet generator, detecting a variation from the back emf signature signifying an approaching failure condition, and adjusting the control parameters to maintain the synthetic jet generator at the optimum flow or adjusting the control parameters to operate the synthetic jet generator at a reduced capacity. In accordance with one or more aspects of the disclosed embodiment, the method includes sending an alert of the approaching failure condition.

It should be understood that the foregoing description is only illustrative of the aspects of the disclosed embodiment. Various alternatives and modifications can be devised by those skilled in the art without departing from the aspects of the disclosed embodiment. Accordingly, the aspects of the disclosed embodiment are intended to embrace all such alternatives, modifications and variances that fall within the scope of the appended claims. Further, the mere fact that different features are recited in mutually different dependent or independent claims does not indicate that a combination of these features cannot be advantageously used, such a combination remaining within the scope of the aspects of the invention.

Thus, the advantageous embodiments provide for an apparatus including: a power supply for providing an input signal at a variable frequency to a jet generator effecting a jet and to a simulated electrical load of the jet generator; detection circuitry for measuring a difference in signals between the jet generator and the simulated electrical load to effect an optimum flow of the jet; and adjustment circuitry for tuning the variable frequency of the power supply to maintain the jet at the optimum flow.

The advantageous embodiments also provide for that the adjustment circuitry is configured to determine a transfer function from the input signal and the difference in signals between the jet generator and the simulated electrical load over a frequency range, for determining control parameters for tuning the variable frequency of the power supply. The advantageous embodiments also provide for that the adjustment circuitry is configured to distinguish alterations in the transfer function indicating degradation of the jet generator.

The advantageous embodiments also provide for that the jet generator produces the optimum flow at a resonant frequency of the jet generator. The advantageous embodiments also provide for that the jet generator comprises a synthetic jet. The advantageous embodiments also provide for that the jet generator comprises a piezo-electric device. The advantageous embodiments also provide for that the jet generator comprises an electro-strictive device. The advantageous embodiments also provide for that the jet generator comprises a speaker coil.

The advantageous embodiments also provide for a control system comprising: a power supply for providing power at a variable frequency to a jet generator effecting a jet and to a simulated electrical load of the jet generator; detection circuitry for measuring a difference in current through the jet generator and simulated electrical load to effect an optimum flow of the jet; and adjustment circuitry for tuning the variable frequency of the power supply to maintain the jet at the optimum flow. The advantageous embodiments also provide for calculation circuitry for determining a transfer function from the power and the difference in current between the jet generator and simulated electrical load over a frequency range, for determining control parameters for the adjustment circuitry.

The advantageous embodiments also provide for that the calculation circuitry is configured to distinguish alterations in the transfer function indicating degradation of the jet generator. The advantageous embodiments also provide for that the jet generator produces the optimum flow at a resonant frequency of the jet generator. The advantageous embodiments also provide for that the jet generator comprises a synthetic jet.

The advantageous embodiments also provide for a method of controlling a jet generator comprising: providing an input signal at a variable frequency to the jet generator and to a simulated electrical load of the jet generator; measuring a difference in signals between the jet generator and the simulated electrical load to effect an optimum flow of a jet generated by the jet generator; and tuning the frequency of the input signal to maintain the jet at the optimum flow. In another illustrative embodiment, the method further includes determining a transfer function from the input signal and the difference in signals between the jet generator and the simulated electrical load to determine control parameters for tuning the variable frequency of the input signal.

In another illustrative embodiment, the method further includes distinguishing alterations in the transfer function indicating degradation of the jet generator. In another illustrative embodiment, the jet generator produces the optimum flow at a resonant frequency of the jet generator. In another illustrative embodiment, the jet generator comprises a synthetic jet. In another illustrative embodiment, the jet generator comprises a piezo-electric device. In another illustrative embodiment, the jet generator comprises an electrostrictive device. In another illustrative embodiment, the jet generator comprises a speaker coil.

The advantageous embodiments also provide for a method of characterizing and monitoring performance of a synthetic jet generator comprising: providing an input signal to the synthetic jet generator and to a simulated electrical load of the synthetic generator over an operating frequency range of the synthetic jet generator; measuring a difference in signals between the jet generator and the simulated electrical load over the operating frequency range; determining a transfer function from the input signal and the difference in signals between the jet generator and the simulated electrical load; and using the transfer function to determine control parameters for the input signal to cause the synthetic jet generator to generate an optimum flow.

The method also includes: identifying changes in the transfer function corresponding to a varying resonant frequency of the synthetic jet generator; and adjusting the control parameters to change a frequency of the input signal to cause the synthetic jet generator to operate at the varying resonant frequency to generate the optimum flow. The method also includes: detecting a variation from the transfer function signifying an approaching failure condition; and adjusting the control parameters to maintain the synthetic jet generator at the optimum flow or adjusting the control parameters to operate the synthetic jet generator at a reduced capacity.

The method also includes sending an alert of the approaching failure condition. The method also includes measuring a difference in signals between the jet generator and the simulated electrical load over the operating frequency range to determine a back emf signature of the jet generator; detecting a variation from the back emf signature signifying an approaching failure condition; and adjusting the control parameters to maintain the synthetic jet generator at the optimum flow or adjusting the control parameters to operate the synthetic jet generator at a reduced capacity. The method also includes sending an alert of the approaching failure condition.

The advantageous embodiments also provide for a jet generator controlled by providing an input signal at a variable frequency to the jet generator and to a simulated electrical load of the jet generator, measuring a difference in signals between the jet generator and the simulated electrical load to identify an optimum flow of a jet generated by the jet generator, and tuning the frequency of the input signal to maintain the jet at the optimum flow. The above are examples only and do not necessarily limit the other examples or the claimed inventions.

The illustrative embodiments may recognize and take into account one or more other different considerations. For example, the illustrative embodiments recognize and take into account that by employing feedback, a synthetic jet is allowed to achieve a much higher resonant amplitude at a relatively low energy cost. This result allows for a higher velocity jet for the same input energy. In one illustrative embodiment, an accelerometer on the driving piston provides the feedback measurements. In another illustrative embodiment, no additional sensor is required, other than a circuit which can measure the voltage applied to the drive circuit, as described further below.

The illustrative embodiments also recognize and take into account that existing synthetic jet devices drive the jet with a higher voltage drive signal to compensate for performance loss due to drag-induced damping. However, this technique results in the need for more energy to use synthetic jets in flow control applications, which may be used in aircraft for example. The advantageous embodiments also recognize and take into account that increasing the voltage drive signal can only achieve so much increase in jet velocity due to drag-induced damping which adds damping at resonance and limits the total jet velocity to a theoretical value. This drag is the drag on the fluid (typically air) as it moves through the aperture of the synthetic jet compression chamber.

The advantageous embodiments recognize and take into account that synthetic jets would be much more attractive in flow control applications if they provided more momentum for a given input energy, relative to existing techniques such as merely increasing input voltage. The advantageous embodiments introduce a means of multiplying this momentum many times with a relatively simple modification of the drive signal by reducing the damping effects of drag on the jet of fluid emerging from the synthetic jet device. Note that the drag itself remain the same, or even increases as the piston velocity increases using the advantageous embodiments, but the damping induced by drag can be decreased by the advantageous embodiments described herein.

Thus, the advantageous embodiments explicitly recognize and take into account that drag-induced damping is a limiting factor on current synthetic jets. This limit results because the jet generating device is driven at resonance and damping in the resonance is directly related to the velocity of the jet.

Thus, the advantageous embodiments employ active control of the synthetic jet to cancel the drag-induced damping that limits the performance of the jet. By providing active control of the piston driving the synthetic jet, the advantageous embodiments provide for cancelling damping induced by drag in synthetic jets using performance enhancement. The performance enhancements are to the algorithm driving the piston. The advantageous embodiments are applicable to all forms of synthetic jet and can multiply performance many times with a relatively simple modification of the drive signal.

Figure 8:
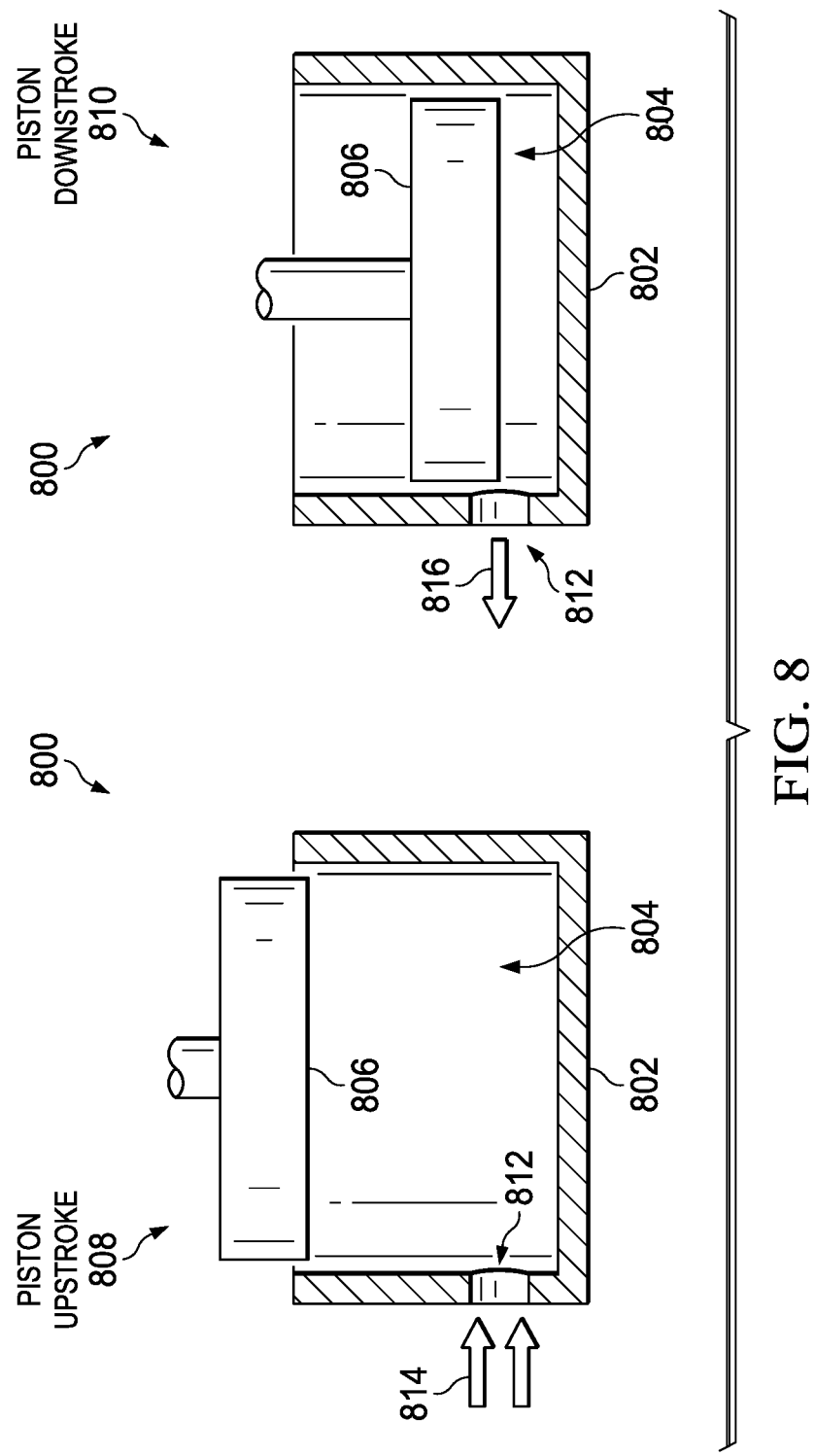
FIG. 8 illustrates a synthetic jet generator, in accordance with an illustrative embodiment.

FIG. 8 illustrates a synthetic jet generator, in accordance with an illustrative embodiment. Synthetic jet generator 800 may represent a portion of jet generator 100 of FIG. 1.

Synthetic jet generator 800 includes housing 802 which defines chamber 804. Piston 806 reciprocates repeatedly up and down relative to chamber 804, thereby repeatedly compressing a fluid inside chamber 804. Piston 806 also may be termed a driving member or a pump member. Position 808 represents an upstroke of piston 806 and position 810 represents a downstroke of piston 806. The fluid inside chamber 804 is typically air, but could be another gas or could be a fluid, such as but not limited to water.

During position 808, or the upstroke of piston 806, the fluid moves into chamber 804 through aperture 812. During position 810, or the downstroke of piston 806, the fluid moves out of chamber 804 through aperture 812. The exit of the fluid from chamber 80 through aperture 812 may be termed a jet or a "synthetic jet", as that term is defined below.

Arrows 814 show the flow of air into chamber 804 and arrow 816 show the flow of air exiting chamber 804. Thus, arrow 816 represents the jet or synthetic jet.

Synthetic jets use the phenomena of directional pumping through an aperture, such as aperture 812, to create an apparent jet. Aperture 812 may be an orifice. Typically, the orifice or aperture vents a cavity that is pumped by reciprocating action of a cylinder or other diaphragm. An illustration of this concept is shown in FIG. 8, as described above.

The directional aspect of the pumping means the air enters the cavity from the sides of the aperture on the upstroke but is directed outward on the downstroke. This affect means an observer immediately in front of the aperture would feel the outward moving air but not the entering air thus the term "synthetic jet." Stated differently, the term "synthetic jet" is defined as a fluid flow which, at a distance away from the aperture from which the flow emerges, is unidirectional and also staccato or pulsed. The "distance" is the distance at which the flow of fluid into the chamber on the upstroke, as shown at arrows 814, can be easily felt or measured. If the piston duty cycle (the time required for the piston to move down and then back up) is high enough, then the jet may appear to human senses to be relatively constant. The duty cycle may also be referred to as a drive frequency of the piston. The drive frequency can vary by electronically controlling the actuators that drive the piston, and also can vary as fluid conditions inside the chamber as a result of the piston acting on the fluid in the chamber. Synthetic jets have applications in flow control devices in fluid systems, including in aircraft operation.

In practice, great effort is taken to increase the velocity of the jet by increasing the stroke of the piston or diaphragm, by decreasing the size of the aperture, and by driving the device at resonance. "Resonance" is the resonance frequency of chamber 804. When the device is characterized at resonance, one can measure the transfer functions that relate the velocity of the jet to the input voltage into the motor driving the piston or diaphragm. This motor is often a piezoceramic device due to the material's superior energy and power density. However, the motor could be a voice coil or any other kind of motor. Thus, the advantageous embodiments are not limited to piezoceramic devices.

Attention is now turned to the physical principles underlying cancellation or reduction of drag-induced dampening in a synthetic jet. As indicated above, the amplitude of motion of a resonant system like the piston in the synthetic jet is limited by the drag-induced damping at resonance of the fluid in the chamber. If there were no damping, the amplitude would continue to increase until the system was limited by the ultimate stress of the material that composes the housing. In the synthetic jet, the damping that limits the amplitude at resonance when the jet produces high (>100 m/s) velocities is dominated by aerodynamic drag that results as the air goes through the aperture of the housing. At a fixed velocity, this behavior can be idealized as a spring mass system as described by equation (1):

$$m\ddot{x}+c\dot{x}+kx=F \tag{1}$$

where m is the mass of the piston, k is the flexure stiffness, c is the damping coefficient at a fixed velocity due to drag, x is the motion of the piston and F is an external force applied to the piston. One dot over a variable represents the first derivative of that variable in calculus, and two dots over a variable represents the second derivative of that variable in calculus. If the motion of the piston can be sensed and used to estimate the velocity of the system, the force applied to the piston can be described as the feedback force. This feedback force is described by equation 2:

$$F=b\dot{x} \tag{2}$$

When the two equations are combined, the result is equation 3:

$$m\ddot{x}+(c-b)\dot{x}+kx=0 \tag{3}$$

If b is less than c, than the new effective damping coefficient is less than the damping without the feedback force. In this way, the feedback force cancels some or all of the damping due to drag. This effect allows the resonant amplitude of the piston to increase, which in turn increases the amount of fluid flowing out of the aperture. Thus, the speed and energy of the jet can be increased substantially, by a factor of two or more. If an appropriate nozzle is added, as described below, the speed of the jet can be increased even further to create a supersonic jet of fluid. The term "supersonic" means that the jet of fluid emerging from the aperture of the housing is moving faster than the speed of sound in the fluid.

Figure 9:
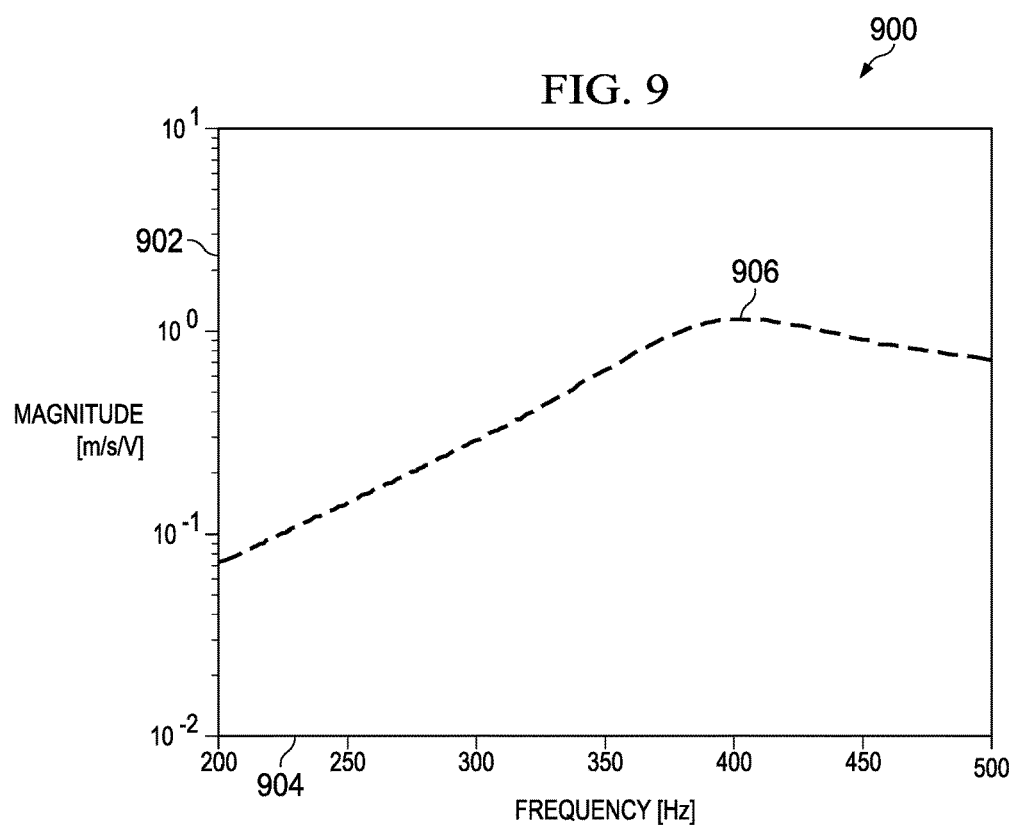
FIG. 9 is a graph of predicted velocity for a given applied voltage for a jet generator, in accordance with an illustrative embodiment.

FIG. 9 is a graph of predicted velocity for a given applied voltage for a jet generator, in accordance with an illustrative embodiment. Graph 900 may be generated in conjunction with the use of a synthetic jet generator such as synthetic jet generator 800 of FIG. 8 or synthetic jet generator 100 of FIG. 1. FIG. 9 represents results measured from use of an actual synthetic jet generator, in particular driven by a piezoceramic motor. However, this illustrative embodiment is only an example and does not necessarily limit the claimed inventions or the other advantageous embodiments described herein.

Graph 900 shows a predicted velocity for a given input voltage on a synthetic jet with a piezoceramic motor. Vertical axis 902 represents the magnitude of the predicted velocity of the synthetic jet for a given input voltage, and is presented on a logarithmic scale. Horizontal axis 904 represents a frequency at which the piston is driven, and is presented on a linear scale.

As shown in FIG. 9, the velocity increases of the synthetic jet with increased frequency, reaching a maximum at a resonance of around four hundred Hz. In this case, the maximum voltage applied to the piezoceramic is around two hundred Volts so the maximum predicted velocity is around two hundred m/s. It has been observed experimentally in all variants of synthetic jets that the sharpness, or Q, of peak 906 changes with the magnitude of the drive signal applied to the piezoceramic when measuring the transfer function. It has been shown by Griffin et. al. [http://spie.org/Publications/Proceedings/Paper/10.1117/1 2.2046442] that the higher damping at higher excitation levels is directly attributable to higher drag-induced damping that results with higher jet velocity.

Figure 10:
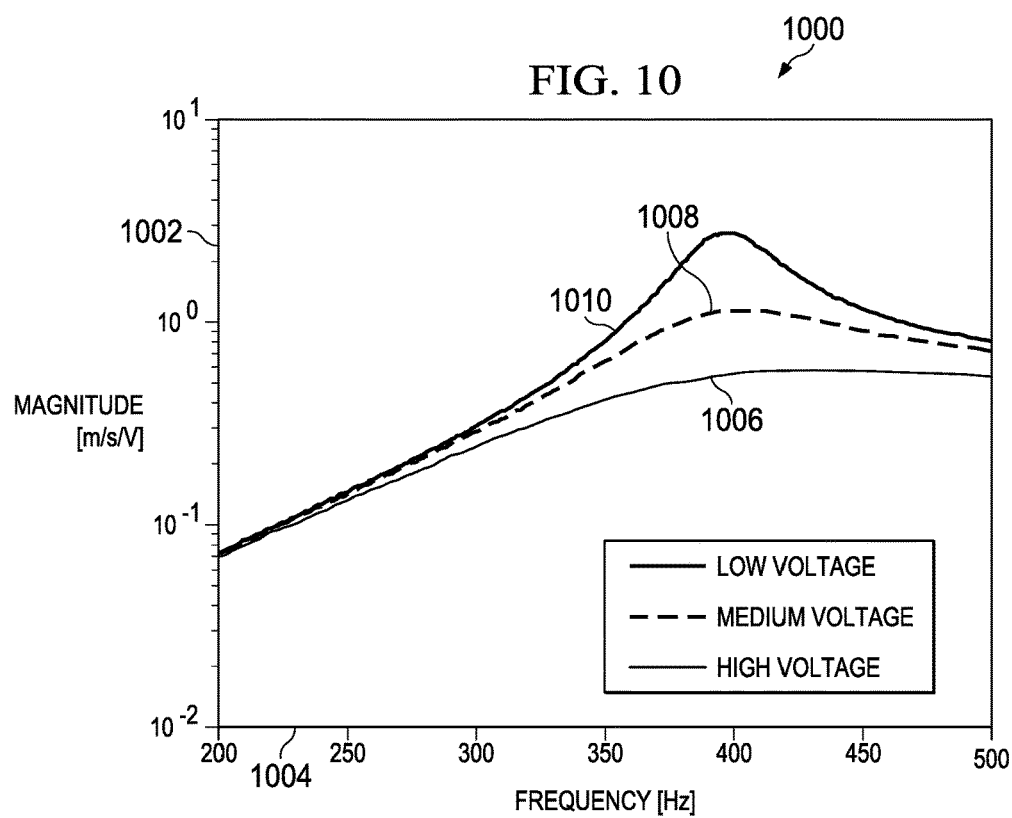
FIG. 10 is a graph of a damping change with varying voltage input for a jet generator, in accordance with an illustrative embodiment.

FIG. 10 is a graph of a damping change with varying voltage input for a jet generator, in accordance with an illustrative embodiment. Graph 1000 may be generated in conjunction with the use of a synthetic jet generator such as synthetic jet generator 800 of FIG. 8 or synthetic jet generator 100 of FIG. 1. FIG. 10 represents results measured from use of an actual synthetic jet generator, in particular driven by a piezoceramic motor. However, this illustrative embodiment is only an example and does not necessarily limit the claimed inventions or the other advantageous embodiments described herein.

Graph 1000 shows a measured velocity for a given input voltage on a synthetic jet with a piezoceramic motor. Vertical axis 1002 represents the magnitude of the predicted velocity of the measured jet for a given input voltage, and is presented on a logarithmic scale. Horizontal axis 1004 represents a frequency at which the piston is driven, and is presented on a linear scale.

Graph 1000 shows three different curves at three different voltages. Curve 1006 represents the synthetic jet generator operated at a high voltage. Curve 1008 represents the synthetic jet generator operated at a medium voltage. Curve 1010 represents the synthetic jet generator operated at a low voltage. The term "low voltage" is a voltage at or near the minimum voltage necessary at which the synthetic jet may be driven. The term "high voltage" is a voltage that is at or near the maximum voltage at which the synthetic jet may be driven. The term "medium voltage" is between the maximum and minimum voltages at which the synthetic jet generator may be driven, but not near the maximum or minimum voltages.

Since drag is proportional to the square of velocity of the synthetic jet, the damping in the system gets larger as the drive signal gets larger. This phenomenon is illustrated in FIG. 10, where three different drive signal levels are applied to a synthetic jet, resulting in higher damping with higher drive signals. This higher damping is a limiting factor in achieving very high velocities in synthetic jets. The advantageous embodiments provide for a means of cancelling this drag-induced damping by employing active control in driving the synthetic jet.

Figure 11:
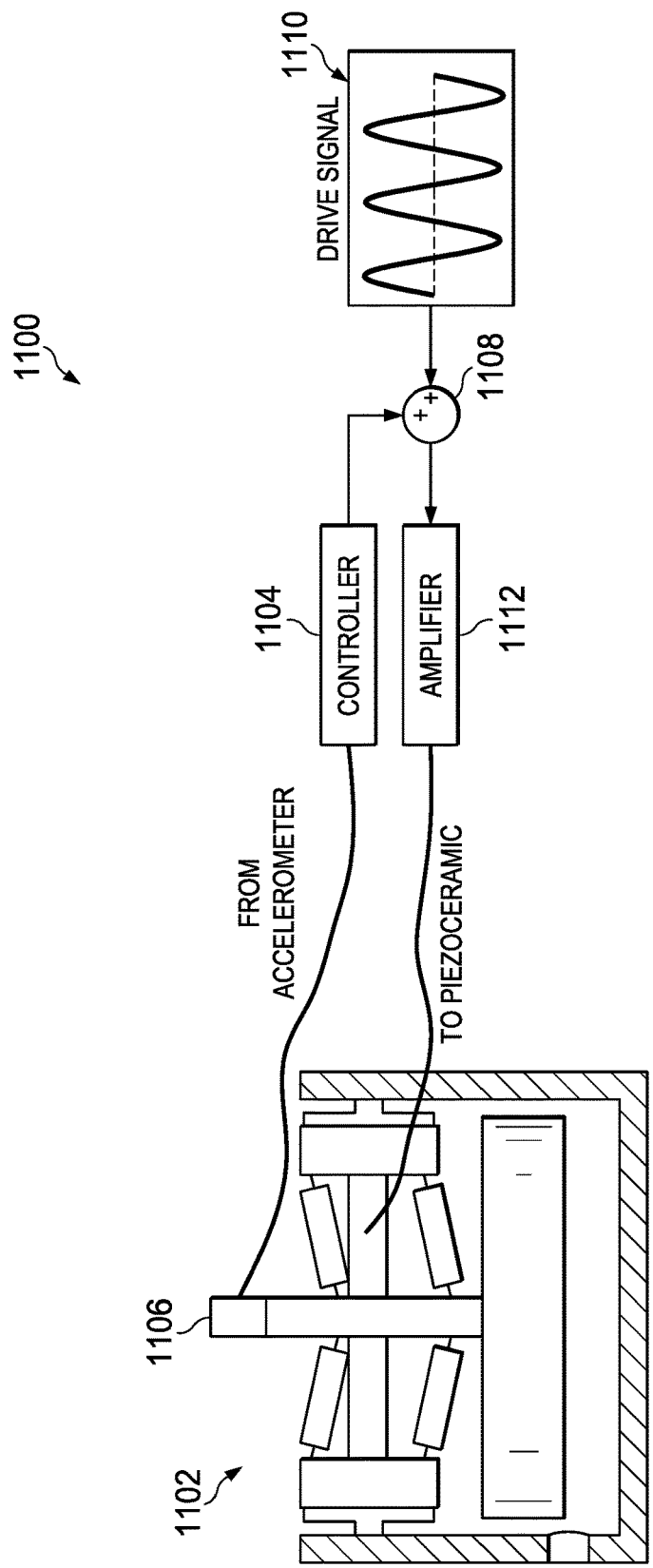
FIG. 11 is an example of a synthetic jet control system for reducing drag-induced damping on the jet, in accordance with an illustrative embodiment.

FIG. 11 is an example of a synthetic jet control system for reducing drag-induced damping on the jet, in accordance with an illustrative embodiment. Control system 1100 includes synthetic jet generator 1102. Synthetic jet generator 1102 may be, for example, synthetic jet generator 100 of FIG. 1 or synthetic jet generator 800 of FIG. 8.

Synthetic jet generator 1102 is attached to controller 1104. In this illustrative embodiment, controller 1104 is connected to sensor 1106, which is itself attached to or otherwise operatively in communication with synthetic jet generator 1102. In an illustrative embodiment, sensor 1106 may be an accelerometer connected to synthetic jet generator 1102. In this case, the accelerometer measures an acceleration of the motor of synthetic jet generator 1102 during operation and communicates that measurement to controller 1104.

In another illustrative embodiment, sensor 1106 may be a circuit in operative communication with the motor that drives synthetic jet generator 1102. For example, if the motor is a piezoceramic motor, then the circuit may be a capacitor placed in parallel with the piezoceramic motor combined with a current sensing resistor (or other transistor) in series with both the capacitor and the piezoceramic motor. In this case, a difference in the voltage measured at the capacitor and at the piezoceramic motor may be taken, and the result provided to controller 1104.

In either case, the signal from controller 1104 is provided to feedback circuit 1108. Drive signal 1110 may also be provided to feedback circuit 1108. Amplifier 1112 may be used to amplify the signal provided to the motor driving synthetic jet generator 1102.

Feedback circuit 1108 may be configured to combine a component to the feedback signal, the component being a force calculated to cancel a drag-induced damping on the fluid exiting the aperture. Feedback circuit 1108 may include a rate estimator and a gain, in the form of an integrated circuit and an amplifier 1112. The rate estimator may be a first circuit that is configured to sum a motion of the piston into the feedback signal, and the gain may be a second circuit that is configured to increase an amplitude of the feedback signal. The feedback circuit, in being configured to add a component to the feedback signal, may be configured to increase a first velocity of the jet relative to a second velocity of the jet that occurs when the chamber is at resonance without inclusion of the feedback signal. The effect of adding the velocity component in a feedback loop is to decrease damping at resonance, thereby increasing amplitude of resonance frequency. The increase is a factor of two or more due to an increase in an amplitude of a resonance frequency of the chamber.

Thus, FIG. 11 shows a schematic of one incarnation that employs active control in driving a synthetic jet. In every case known to the inventor, synthetic jets are driven at resonance without consideration of the motion of the diaphragm pumping the cavity. In FIG. 11, an accelerometer is added to the piston that is pumping the cavity. The motion of the piston is included in a feedback loop and summed into the drive signal of the device.

Literature exists describing the use of feedback to increase damping of a resonance that is causing excessive vibration in a system including Griffin Griffin, S., "Vibration damping system," U.S. Pat. No. 5,378,974, and other references. What has not been explored is the use of feedback to decrease damping in synthetic jet generation devices. No known references exist citing the use of feedback in driving synthetic jets to increase jet velocity.

Figure 12:
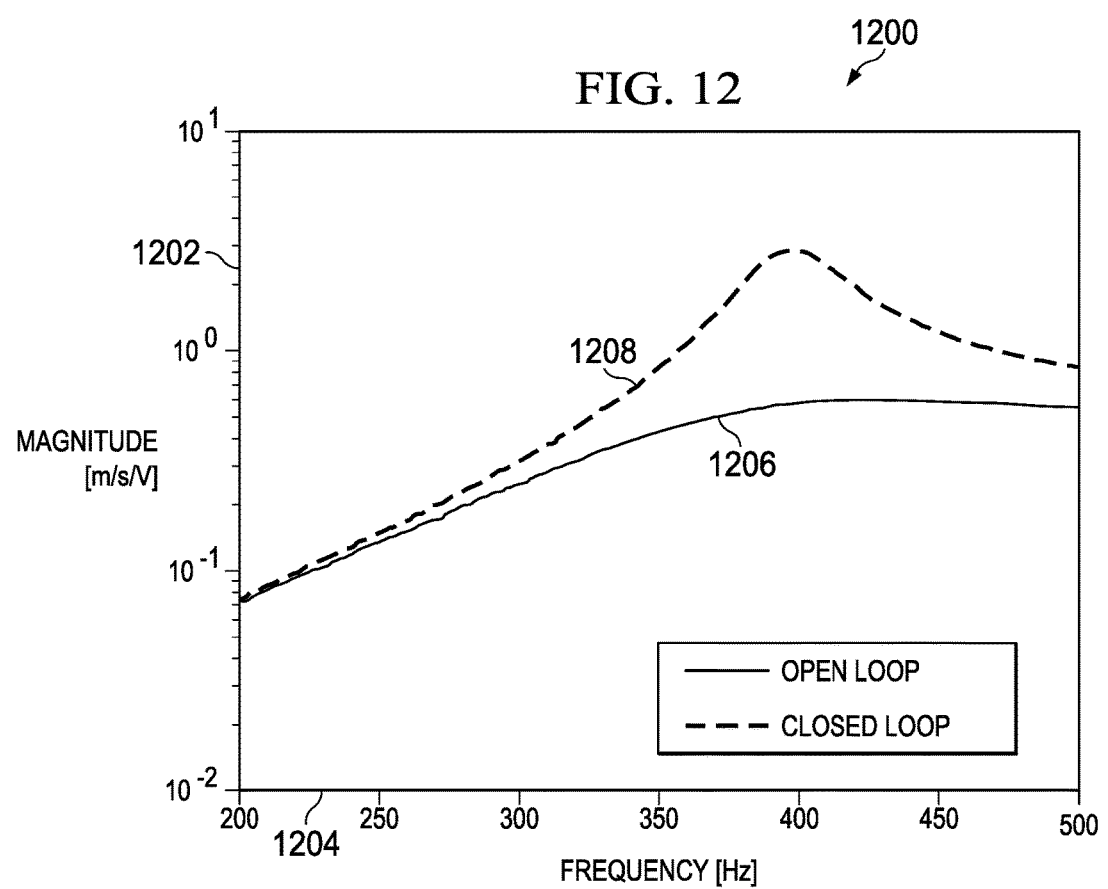
FIG. 12 is a graph of jet velocity versus piston frequency that demonstrates an example of a closed loop control for a synthetic jet, in accordance with an illustrative embodiment.

In the case of a synthetic jet, the very factor that is limiting velocity, damping related to drag, can be cancelled using an active feedback loop that positively feeds back the velocity of the piston at resonance. In the case of FIG. 11, the controller can be as simple as a rate estimator and a gain. FIG. 12, below, shows the effect of feedback on the actuator with a high voltage drive signal.

Attention is now turned to a specific implementation of a feedback algorithm that may be used to implement the advantageous embodiments. This algorithm is exemplary only and does not necessarily limit the other examples described herein, or the claimed inventions.

In one embodiment, the signal from the accelerometer is passed through an analog second-order bandpass filter with a damping of 5% of critical damping and center frequency corresponding to the drive frequency of the device. The resulting signal is then passed through an analog second-order lowpass filter with damping of 20% of critical damping and nominal cutoff frequency set equal to the piston drive frequency.

In addition, an analog gain stage is added in series with the filters to allow for changing the amplitude of the feedback signal. This series combination of bandpass and lowpass filters along with a gain stage nominally provides an amplified rate estimation for a system with no other delays or coupling.

In practice, a calibration step where the frequency of the low pass filter is adjusted up and down and the gain is adjusted up and down until it is observed that damping is reduced with the control feedback loop closed. These adjustments compensate for delays and other non-ideal factors in the system. This embodiment could be simplified using a digital representation of the circuit and a method of auto calibration that replicates the calibration step previously described.

FIG. 12 is a graph of jet velocity versus piston frequency that demonstrates an example of a closed loop control for a synthetic jet, in accordance with an illustrative embodiment. Graph 1000 may be generated in conjunction with the use of a synthetic jet generator such as synthetic jet generator 800 of FIG. 8 or synthetic jet generator 100 of FIG. 1. FIG. 12 represents results measured from use of an actual synthetic jet generator, in particular driven by a piezoceramic motor. However, this illustrative embodiment is only an example and does not necessarily limit the claimed inventions or the other advantageous embodiments described herein.

Graph 1200 shows a measured velocity for a given input voltage on a synthetic jet with a piezoceramic motor, but while using the drag-induced damping cancelling feedback system technique described above. Vertical axis 1202 represents the magnitude of the measured velocity of the synthetic jet for a given input voltage, and is presented on a logarithmic scale. Horizontal axis 1204 represents a frequency at which the piston is driven, and is presented on a linear scale.

Curve 1206 represents an open loop (no velocity feedback). Curve 1208 represents a closed loop (with velocity feedback).

FIG. 12 illustrates that the amplitude of the velocity can be multiplied many times by incorporating a feedback loop. This improvement is a great increase in performance that is applicable to every synthetic jet by effectively incorporating knowledge of the piston in the drive signal along with the addition of a small force that cancels drag-induced damping and allows the resonance to build to a higher amplitude. This predicted increase has been verified experimentally, where a synthetic jet was driven at resonance to its maximum voltage and its jets velocity was greatly increased by incorporating the described feedback loop and controller.

Although the experimental implementation and the description shows an accelerometer used in the feedback loop, this addition is not necessary. FIG. 1 through FIG. 7 describe the use of self-sensing in driving a piezoceramic or voice coil based synthetic jet. This self-sensing signal can readily be used in a feedback loop, requiring no additional sensors. An example of a self-sensing circuit may be the motor, a capacitor connected in parallel to the motor, and a resistor connected to the motor and capacitor in series, as described above. For the advantageous embodiments described herein, monitoring just the transfer function of the current consumed by the piezoceramic over the voltage may give sufficient sensitivity to be used in this performance enhancing feedback loop.

With respect to aerospace applications, the frequency where the jet is most effective is expected to shift under different atmospheric pressures as an airplane climbs or descends. In fact, this frequency may be tracked. If feedback is employed in the method described, gain could be increased until the resonance is unstable. This feedback loop could be designed to cause an instability over a wide frequency range. The resulting device would resonate at maximum amplitude without having to track the resonance frequency under changing conditions.

Thus, the advantageous embodiments described herein provide for a performance enhancing method of multiplying velocity produced by a synthetic jet using feedback sensing of the piston or diaphragm pumping the cavity. An accelerometer may be used as the sensor, or a self-sensing circuit may be used as the sensor. The advantageous embodiments also provide for a synthetic jet that uses feedback to induce instability and not require frequency tracking to display maximum amplitude resonance.

The advantageous embodiments described above typically generate subsonic jets. A subsonic jet results when the fluid emitted from the aperture is slower than the speed of sound. The advantageous embodiments also contemplate generating transsonic jets or supersonic jets. A transsonic jet results when the fluid emitted from the aperture is faster than the speed of sound. To date, the inventor is unaware of any synthetic jet generator that can generate a supersonic synthetic jet.

A supersonic jet may be generated by attaching a nozzle to the aperture. The nozzle may initially flare inwardly from the aperture, but then turn back outwardly until the end of the nozzle is smaller than the aperture. In this manner, a supersonic jet may be generated. Further optimization using Computational Fluid Dynamics (CFD) codes may also find other nozzle solutions for supersonic jets.

Figure 13:
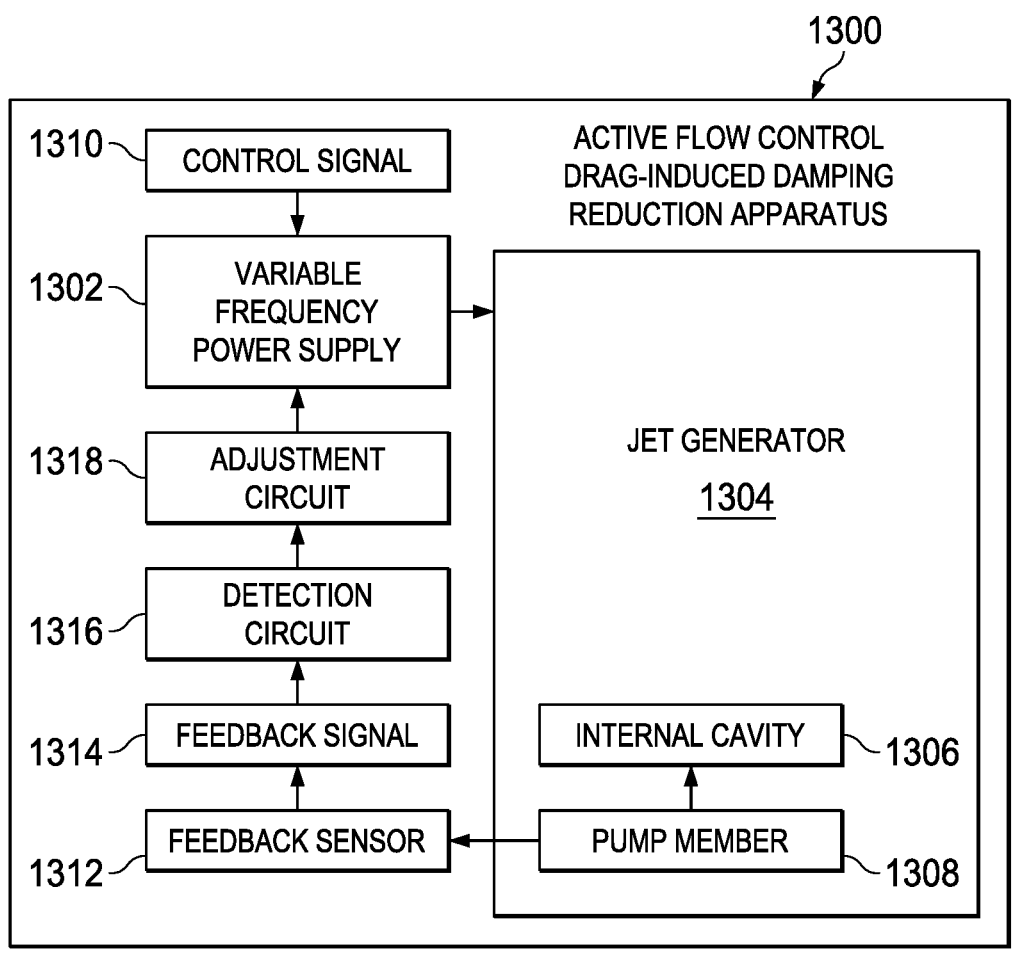
FIG. 13 is a block diagram of an active flow control drag-induced damping reduction apparatus, in accordance with an illustrative embodiment.

FIG. 13 is a block diagram of an active flow control drag-induced damping reduction apparatus, in accordance with an illustrative embodiment. Active flow control drag-induced damping reduction apparatus 1300 may be a variation of synthetic jet generator 100 of FIG. 1 or synthetic jet generator 800 of FIG. 8.

Active flow control drag-induced damping reduction apparatus 1300 may include variable frequency signal power supply 1302. Active flow control drag-induced damping reduction apparatus 1300 may also include jet generator 1304 defining an internal cavity 1306 and having pump member 1308, and coupled to variable frequency power supply 1302 to receive a control signal 1310.

Feedback sensor 1312 is coupled to pump member 1308 to generate feedback signal 1314 measuring the reciprocating motion of pump member 1308. Detection circuit 1316 receives feedback signal 1314 and measures a difference compared to variable frequency power supply 1302. Adjustment circuit 1318 receives the measured difference and tunes the variable frequency signal of variable frequency power supply 1302 to maintain jet generator 1304 at an optimum flow.

In an illustrative embodiment, feedback sensor 1312 may be at least one of an accelerometer coupled to pump member 1308 and an induction coil coupled to pump member 1308. In an illustrative embodiment, the adjustment circuit is configured to tune the variable frequency signal of the power supply to reduce a drag-induced damping on air exiting an aperture of the jet generator.

In this illustrative embodiment, feedback sensor 1312 may be further configured to generate feedback signal 1314 while pump member 1308 is operating during resonance of jet generator 1304. Feedback sensor 1312 may be so configured by attaching an accelerometer to pump member 1308, or by creating a self-sensing circuit such as that described above.

In still another illustrative embodiment, adjustment circuit 1318 may be a rate estimator and a gain. The rate estimator and the gain may both be circuits which accomplish a function. The rate estimator estimates a rate at which pump member 1308 is moving and the gain amplifies feedback signal 1314 or some other signal in the system. Thus, the rate estimator may be a first circuit that is configured to sum a motion of pump member 1308 into feedback signal 1314. Similarly, the gain may be a second circuit that is configured to increase an amplitude of feedback signal 1314.

The advantageous embodiments described with respect to FIG. 13 do not necessarily limit the claimed inventions. More or fewer components, modules, or bocks may be present. Active flow control drag-induced damping reduction apparatus 1300 may be varied as described above with respect to FIG. 8 through FIG. 12.

Figure 14:
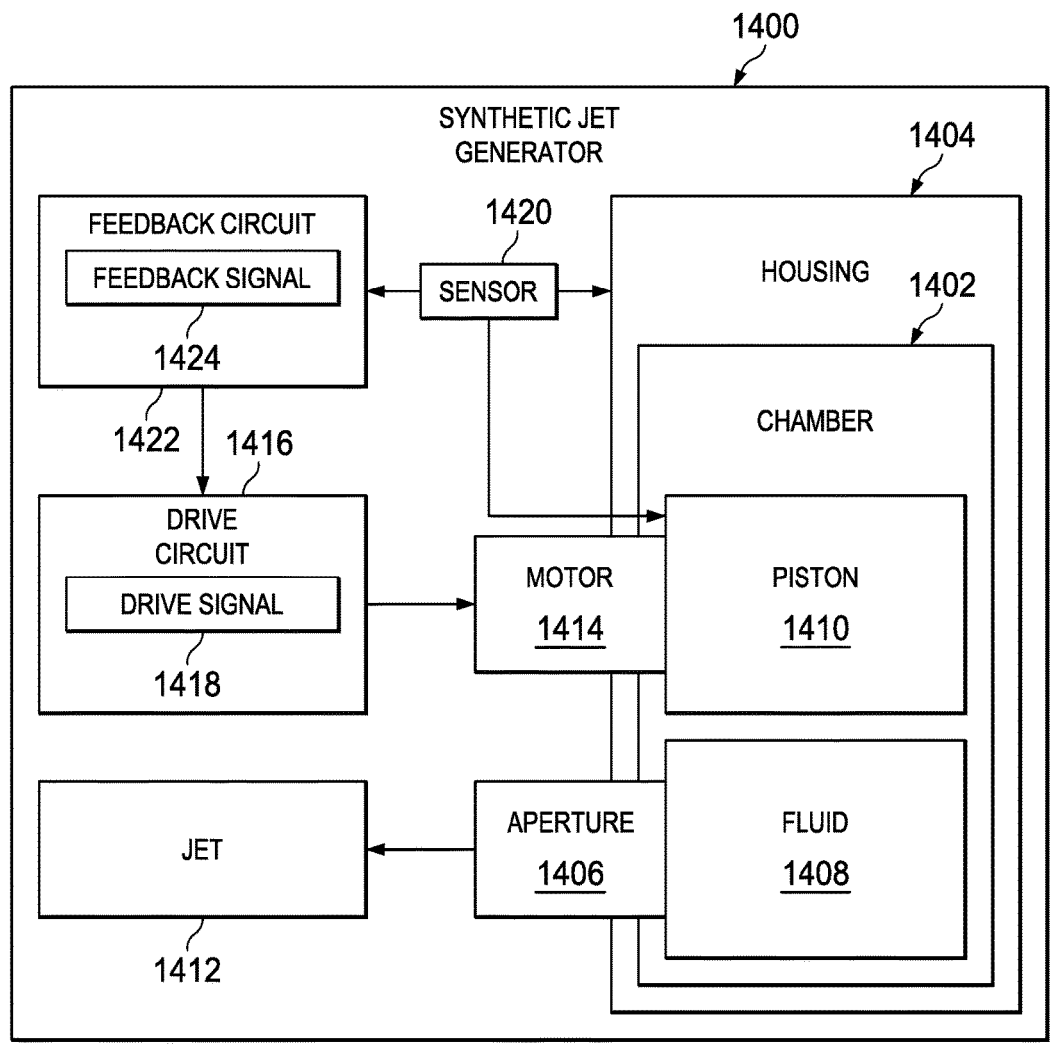
FIG. 14 is a block diagram of a synthetic jet generator, in accordance with an illustrative embodiment.

FIG. 14 is a block diagram of a synthetic jet generator, in accordance with an illustrative embodiment. Synthetic jet generator 1400 may be a variation of synthetic jet generator 100 of FIG. 1, synthetic jet generator 800 of FIG. 8, or active flow control drag-induced damping reduction apparatus 1300 of FIG. 13.

Synthetic jet generator 1400 may include chamber 1402 defined by housing 1404. Aperture 1406 is disposed in housing 1404. Fluid 1408 is disposed in chamber 1402.

Piston 1410 is operably disposed to repeatedly compress fluid 1408 in chamber 1402. During compression strokes piston 1410 forces jet 1412 of fluid 1408 to flow from aperture 1406.

Motor 1414 connected to piston 1410 is configured to drive piston 1410. Drive circuit 1416 is in communication with motor 1414 and is configured to control operation of piston 1410 by generating drive signal 1418 communicated to motor 1414.

Sensor 1420 is operably connected to one of piston 1410 and housing 1404, and is configured to take a measurement of a motion of piston 1410. Feedback circuit 1422 is connected to sensor 1420 and to drive circuit 1416. Feedback circuit 1422 is configured to incorporate feedback signal 1424 into drive signal 1418. Feedback signal 1424 includes the measurement of the motion of piston 1410 at a resonance frequency of chamber 1402.

The advantageous embodiments described with respect to FIG. 14 above may be varied. For example, feedback circuit 1422 may be further configured to combine a component to feedback signal 1424, the component being a force calculated to cancel a drag-induced damping on the fluid exiting aperture 1406. In an illustrative embodiment, feedback circuit 1422 includes a rate estimator and a gain. The rate estimator may be a first circuit that is configured to sum a motion of the piston into the feedback signal, and the gain may be a second circuit that is configured to increase an amplitude of the feedback signal.

In a related illustrative embodiment, feedback circuit 1422, in being configured to add a component to feedback signal 1424, is further configured to increase a first velocity of jet 1412 relative to a second velocity of jet 1412 that occurs when chamber 1402 is at resonance without inclusion of feedback signal 1424. The effect of adding the velocity component in a feedback loop is to decrease damping at resonance, thereby increasing amplitude of resonance frequency. In an illustrative embodiment, the increase may be a factor of two or more due to an increase in an amplitude of a resonance frequency of the chamber. In the case of a supersonic jet, the gain may be higher yet, by a factor of ten or more.

In another illustrative embodiment, sensor 1420 may be an accelerometer in direct contact with piston 1410. In still another illustrative embodiment, motor 1414 may be a piezoceramic device or a voice coil device. In this case, sensor 1420 may be connected to the piezoceramic device or the voice coil device. In this particular illustrative embodiment, the sensor may be a circuit which measures a voltage being applied to motor 1414. In a different illustrative embodiment, sensor 1420 may be an induction coil coupled to piston 1410.

The advantageous embodiments described with respect to FIG. 14 do not necessarily limit the claimed inventions. More or fewer components, modules, or bocks may be present. Synthetic jet generator 1400 may be varied as described above with respect to FIG. 8 through FIG. 12.

Figure 15:
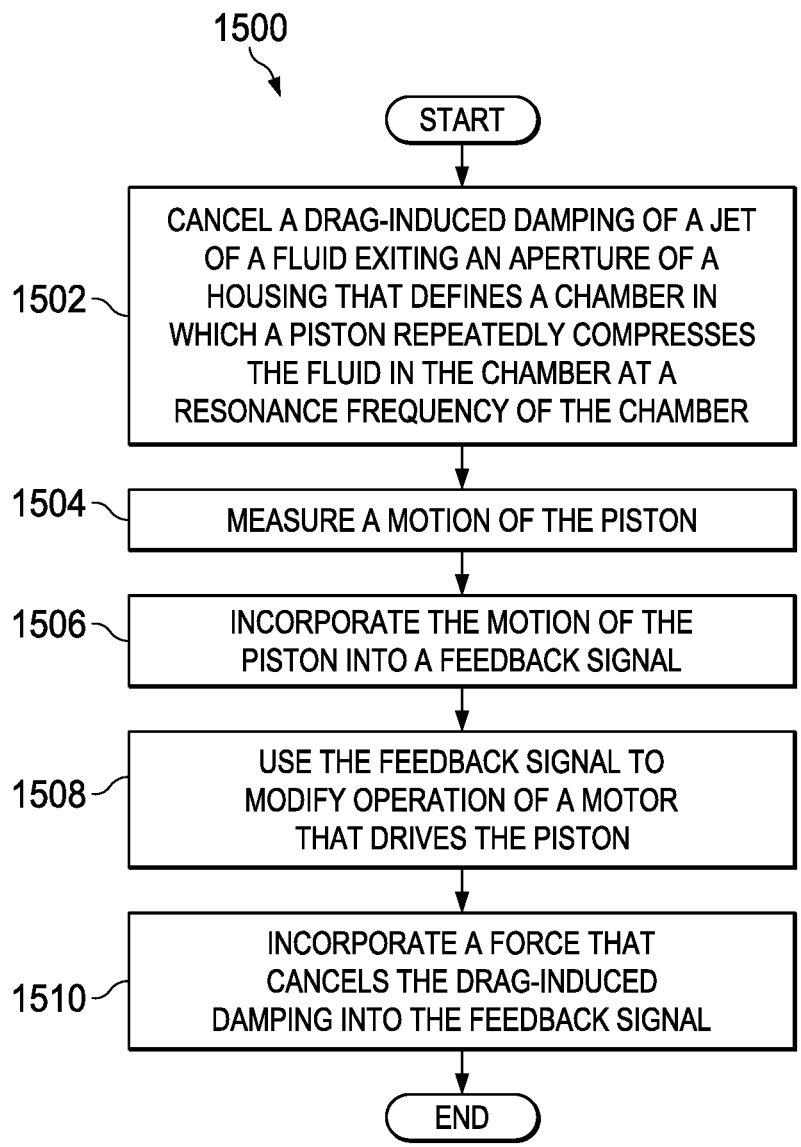
FIG. 15 is a flowchart of method of improving operation of a synthetic jet generator, in accordance with an illustrative embodiment.

FIG. 15 is a flowchart of method of improving operation of a synthetic jet generator, in accordance with an illustrative embodiment. Method 1500 may be implemented using a synthetic jet generator, such as synthetic jet generator 100 of FIG. 1, synthetic jet generator 800 of FIG. 8, active flow control drag-induced damping reduction apparatus 1300 of FIG. 13, or synthetic jet generator 1400 of FIG. 14.

Method 1500 may be characterized as a method of improving the operation of a synthetic jet generator. Method 1500 may include cancelling a drag-induced damping of a jet of a fluid exiting an aperture of a housing that defines a chamber in which a piston repeatedly compresses the fluid in the chamber at a resonance frequency of the chamber (operation 1502). Method 1500 may terminate at this point, but may be varied as provided below.

For example, cancelling may include measuring a motion of the piston (operation 1504), incorporating the motion of the piston into a feedback signal (operation 1506), and using the feedback signal to modify operation of a motor that drives the piston (operation 1508). In a further illustrative embodiment, cancelling may further include incorporating a force that cancels the drag-induced damping into the feedback signal (operation 1510). In a yet further illustrative embodiment, cancelling increases an amplitude of the resonance frequency, thereby increasing a velocity of the jet by at least a factor of two. In a still different illustrative embodiment, measuring a motion of the piston is accomplished using an accelerometer. The method may terminate thereafter.

The advantageous embodiments described with respect to FIG. 15 do not necessarily limit the claimed inventions. More or fewer steps, operations, or other variations may be present. Method 1500 may be varied as described above with respect to FIG. 8 through FIG. 12.

The description of the different illustrative embodiments has been presented for purposes of illustration and description, and may be not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A synthetic jet generator comprising:
a chamber defined by a housing, wherein an aperture is disposed in the housing, and wherein a fluid is disposed in the chamber;
a piston operably disposed to repeatedly compress the fluid in the chamber, wherein during compression strokes the piston forces a jet of the fluid to flow from the aperture;
a motor connected to the piston and configured to drive the piston;
a drive circuit in communication with the motor and configured to control operation of the piston by generating a drive signal communicated to the motor;
a sensor operably connected to one of the piston and the housing, and configured to take a measurement of a motion of the piston;
a feedback circuit connected to the sensor and to the drive circuit, and configured to incorporate a feedback signal into the drive signal, wherein the feedback signal includes the measurement of the motion of the piston at a resonance frequency of the chamber;
wherein the feedback circuit is further configured to add a component to the feedback signal, the component comprising a force calculated to cancel damping effects of a drag on the fluid flowing from the aperture;
wherein the feedback circuit includes a rate estimator and a gain, wherein the rate estimator is a first circuit that is configured to sum the motion of the piston into the feedback signal, and wherein the gain comprises a second circuit that is configured to increase an amplitude of the feedback signal; and
wherein the feedback circuit, in being configured to add a component to the feedback signal, is further configured to increase a first velocity of the jet relative to a second velocity of the jet that occurs when the chamber is at resonance without inclusion of the feedback signal.

2. The synthetic jet generator of claim 1, wherein the increase is a factor of two or more due to an increase in an amplitude of a resonance frequency of the chamber.

3. The synthetic jet generator of claim 1, wherein the sensor comprises an accelerometer in direct contact with the piston.

4. The synthetic jet generator of claim 1, wherein the motor is a piezoceramic device or a voice coil device, and wherein the sensor is connected to the piezoceramic device or the voice coil device.

5. The synthetic jet generator of claim 4, wherein the sensor comprises an induction coil coupled to the piston.

6. A method of improving operation of a synthetic jet generator, the method comprising:
cancelling a drag-induced damping of a jet of air exiting an aperture of a housing that defines a chamber in which a piston repeatedly compresses the air in the chamber at a resonance frequency of the chamber; and
increasing a gain of a feedback signal until a resonance frequency of the air in the chamber becomes unstable, whereby the air in the chamber resonates at a maximum amplitude for a given drive frequency of the piston without tracking the resonance frequency under changing drive frequency conditions.

7. The method of claim 6, wherein cancelling comprises:
measuring a motion of the piston;
incorporating the motion of the piston into a feedback signal; and
using the feedback signal to modify operation of a motor that drives the piston.

8. The method of claim 7, wherein cancelling further comprises:
incorporating a force that cancels the drag-induced damping into the feedback signal.

9. The method of claim 8, wherein cancelling increases an amplitude of the resonance frequency, thereby increasing a velocity of the jet by at least a factor of two.

10. The method of claim 7, wherein measuring a motion of the piston is accomplished using an accelerometer.

* * * * *